United States Patent
Luo et al.

(10) Patent No.: US 11,729,662 B2
(45) Date of Patent: Aug. 15, 2023

(54) ONE-HOP PACKET DELAY BUDGET (PDB) IN AN INTEGRATED ACCESS AND BACKHAUL (IAB) NETWORK

(71) Applicant: QUALCOMM Incorporated, San Diego, CA (US)

(72) Inventors: Jianghong Luo, Skillman, NJ (US); Navid Abedini, Basking Ridge, NJ (US); Karl Georg Hampel, Hoboken, NJ (US); Naeem Akl, Somerville, NJ (US); Luca Blessent, Whitehouse Station, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/468,452

(22) Filed: Sep. 7, 2021

(65) Prior Publication Data
US 2022/0078663 A1  Mar. 10, 2022

Related U.S. Application Data

(60) Provisional application No. 63/075,792, filed on Sep. 8, 2020, provisional application No. 63/075,784, filed on Sep. 8, 2020.

(51) Int. Cl.
| | |
|---|---|
| *H04W 28/02* | (2009.01) |
| *H04W 40/04* | (2009.01) |
| *H04W 72/1263* | (2023.01) |
| *H04L 45/12* | (2022.01) |

(52) U.S. Cl.
CPC ....... *H04W 28/0268* (2013.01); *H04L 45/123* (2013.01); *H04W 28/0252* (2013.01); *H04W 40/04* (2013.01); *H04W 72/1263* (2013.01)

(58) Field of Classification Search
CPC ............... H04L 45/123; H04L 47/283; H04W 28/0236; H04W 28/0252; H04W 28/0268; H04W 40/04; H04W 72/1263; H04W 88/04
See application file for complete search history.

(56) References Cited

U.S. PATENT DOCUMENTS

| | | | | |
|---|---|---|---|---|
| 2018/0279319 | A1* | 9/2018 | Yu | H04W 28/0268 |
| 2019/0288953 | A1* | 9/2019 | Yavuz | H04W 28/0257 |
| 2020/0187040 | A1* | 6/2020 | Tsai | H04W 24/10 |
| 2020/0267088 | A1* | 8/2020 | Navratil | H04L 43/16 |
| 2020/0367094 | A1* | 11/2020 | Eriksson | H04W 72/1242 |
| 2021/0105698 | A1* | 4/2021 | Jactat | H04W 40/12 |

* cited by examiner

*Primary Examiner* — Pao Sinkantarakorn
*Assistant Examiner* — Pawaris Sinkantarakorn
(74) *Attorney, Agent, or Firm* — Patterson & Sheridan, L.L.P/Qualcomm Incorporated

(57) ABSTRACT

Aspects of the present disclosure provide techniques for packet delay budget (PDB) coordination between two integrated access and backhaul (IAB) nodes for a radio link control (RLC) channel in an IAB network. An IAB node may dynamically adjust its configured one-hop RLC channel PDB based on channel conditions or buffer loading associated with the IAB node. The IAB node may then indicate bonus PDB at a next-hop node or request additional PDB from the next-hop node.

30 Claims, 19 Drawing Sheets

ONE-HOP PACKET DELAY BUDGET (PDB) IN AN INTEGRATED ACCESS AND BACKHAUL (IAB) NETWORK

CROSS-REFERENCE TO RELATED APPLICATIONS

This applications benefit of U.S. Provisional Patent Application Ser. No. 63/075,784, entitled "Dynamic Coordination of One-Hop PDB in an IAB Network," filed Sep. 8, 2020; and U.S. Provisional Patent Application Ser. No. 63/075,792, entitled "Dynamic Determination of One-Hop Packet Delay Budget (PDB) in an Integrated Access and Backhaul (IAB) Network," filed Sep. 8, 2020; both of which are assigned to the assignee hereof, and both of which are hereby incorporated by reference in their entirety.

BACKGROUND

Field of the Disclosure

Aspects of the present disclosure relate to wireless communications, and more particularly, to techniques for dynamic coordination of one-hop packet delay budgets (PDBs) between two nodes for radio link control (RLC) channels in an integrated access and backhaul (IAB) network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using the OFDMA with a cyclic prefix (CP) on a downlink (DL) and on an uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved packet delay budget (PDB) coordination between two nodes for a radio link control (RLC) channel in an integrated access and backhaul (IAB) network.

Certain aspects of the subject matter described in this disclosure can be implemented in a method for wireless communication by a first node. The method generally includes receiving a configuration of a first one-hop PDB for a first RLC channel scheduled by the first node. The method generally includes determining a second one-hop PDB to use for the first RLC channel. The method generally includes notifying a second node of a PDB adjustment value to be applied for a second RLC channel scheduled by the second node, wherein the PDB adjustment value is at least based on a difference between the first one-hop PDB and the second one-hop PDB.

Certain aspects of the subject matter described in this disclosure can be implemented in a method for wireless communication by a first node. The method generally includes receiving a configuration of a first one-hop packet delay budget (PDB) for an RLC channel scheduled by the first node. The method generally includes receiving a notification including a PDB adjustment value from a second node to adjust the first one-hop PDB. The method generally includes adjusting the first one-hop PDB using the PDB adjustment value to determine a second one-hop PDB to use for the RLC channel.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
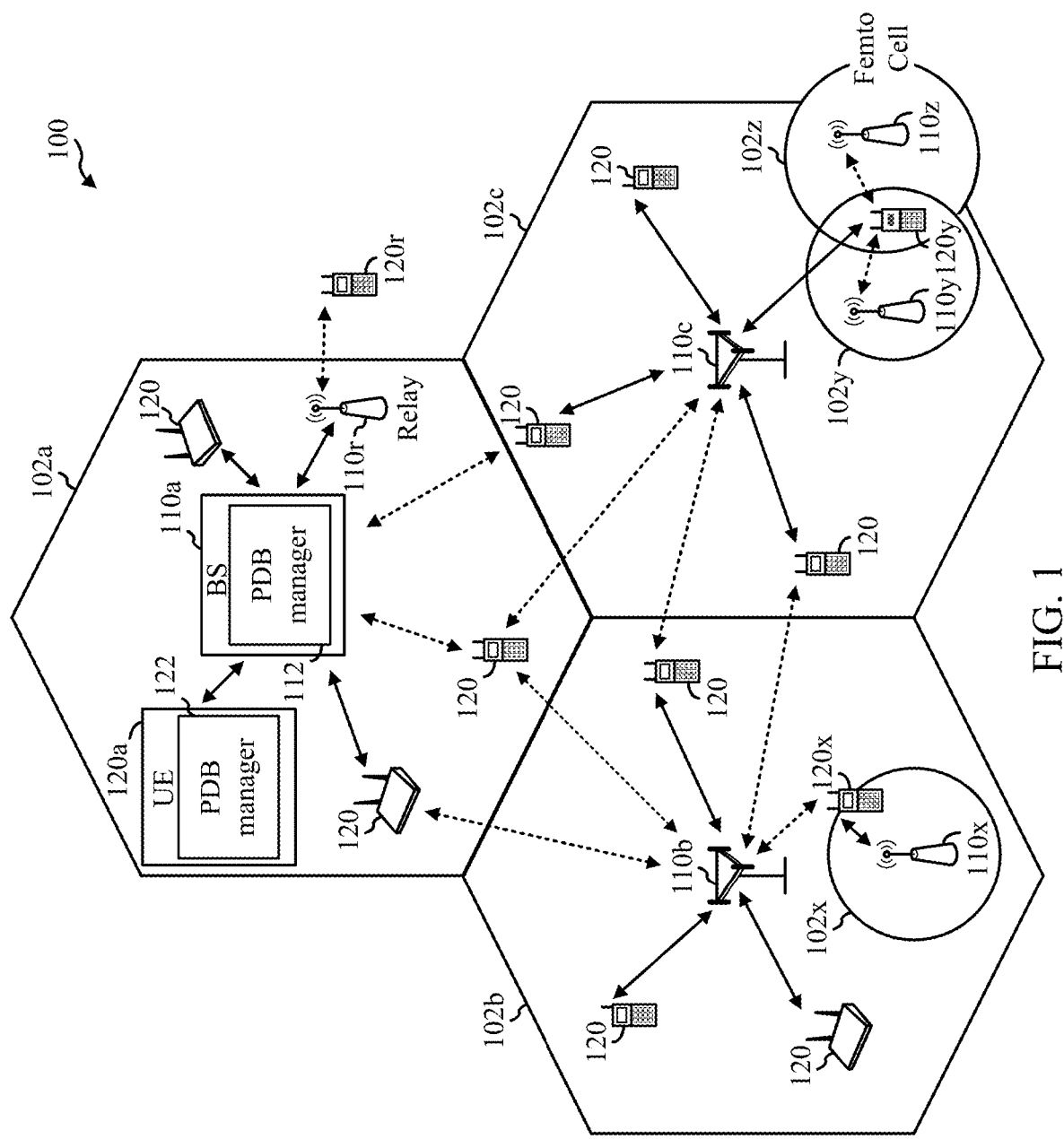
FIG. 1 is a block diagram conceptually illustrating an example wireless communication network, in accordance with certain aspects of the present disclosure.
Figure 1:
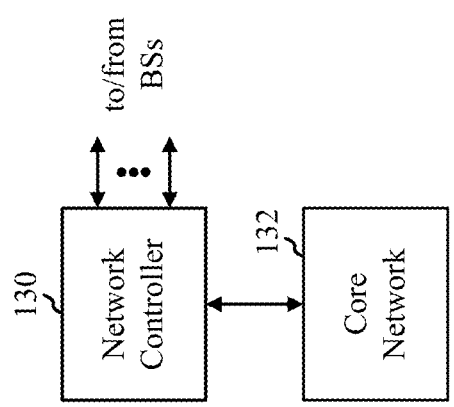

Aspects of the present disclosure provide apparatus, methods, processing systems, and computer readable mediums for dynamic packet delay budget (PDB) coordination for a radio link control (RLC) channel between two nodes in an integrated access and backhaul (IAB) network.

In certain IAB systems, a process is implemented for coordinating PDBs between a parent IAB node and a child IAB node for BH RLC channels, on top of an existing centralized approach with semi-static configuration of the PDBs by an IAB donor node (also known as a donor central unit (CU) node), so that an IAB node (for example, the parent IAB node) may dynamically adjust its configured PDB based on a channel condition or buffer loading, and indicate bonus PDB to a next-hop node (for example, the child IAB node) within the IAB network or request additional PDB from the next-hop node (for example, the child IAB node) within the IAB network.

In certain IAB systems, an IAB donor node may determine a first one-hop PDB for a first RLC channel between IAB nodes in the IAB network. The IAB nodes may include a first IAB node. The IAB nodes may further include a second IAB node, which is a child IAB node of the first IAB node. The first IAB node may receive a configuration of the first one-hop PDB for the first RLC channel between the first node and the second node from the IAB donor node. The first IAB node may determine a second one-hop PDB to use for the first RLC channel scheduled by the first node. Upon determination of the second one-hop PDB, the first IAB node may notify the second node of a PDB adjustment value to be applied to a second RLC channel scheduled by the second node. In one non-limiting example, the notification of the PDB adjustment value to the second node may indicate an extra PDB to use for the second RLC channel scheduled by the second node. In another non-limiting example, the notification of the PDB adjustment value to the second node may include sending a request to the second node to borrow the PDB corresponding to the PDB adjustment value.

The following description provides examples of the dynamic PDB coordination for the RLC channel between the two nodes in the IAB network, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network).

As shown in FIG. 1, the wireless communication network 100 may be in communication with a core network 132. The core network 132 may in communication with one or more base station (BSs) 110 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and the UEs 120 may be configured for communication in an IAB network. The BS 110a may function as an IAB donor node, with a connection to the CN 132. The BS 110a may function as an intermediate IAB node (e.g., a parent IAB node and/or a child IAB node). As shown in FIG. 1, the BS 110a includes a PDB manager 112 that may be configured for dynamic PDB coordination for a RLC channel between two nodes in an IAB network, in accordance with aspects of the present disclosure. The UE 120a includes a PDB manager 122 that may be configured for the dynamic PDB coordination for the RLC channel between the two nodes in the IAB network, in accordance with aspects of the present disclosure.

The BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
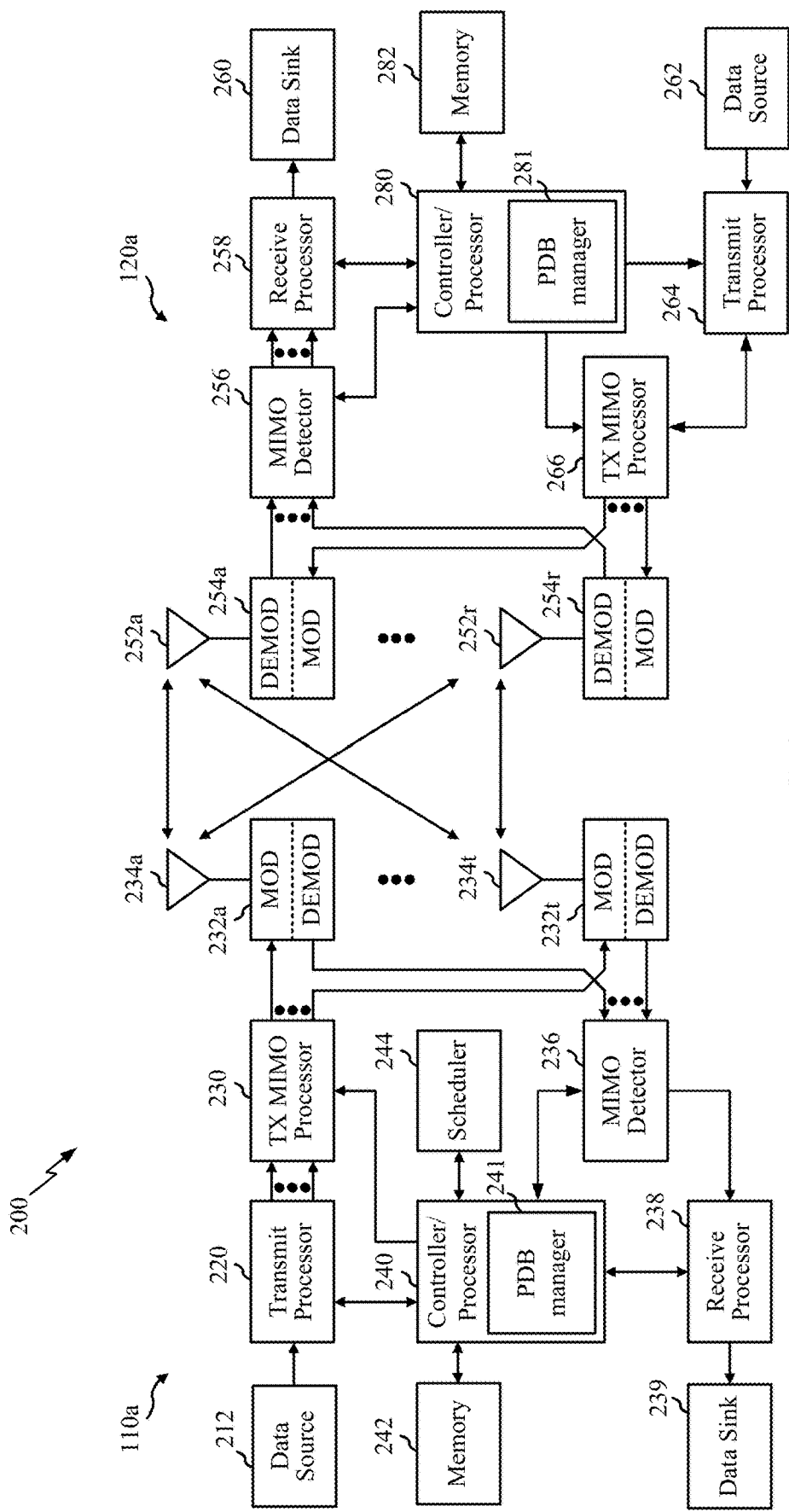
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PDB manager 241 (for example, a BS PDB coordination manager) that may be configured for dynamic PDB coordination for a RLC channel between two nodes in an IAB network, according to aspects described herein. As shown in FIG. 2, the controller/processor 280 of the UE 120a has a PDB manager 281 (for example, a UE PDB coordination manager) that may be configured for the dynamic PDB coordination for the RLC channel between the two nodes in the IAB network, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
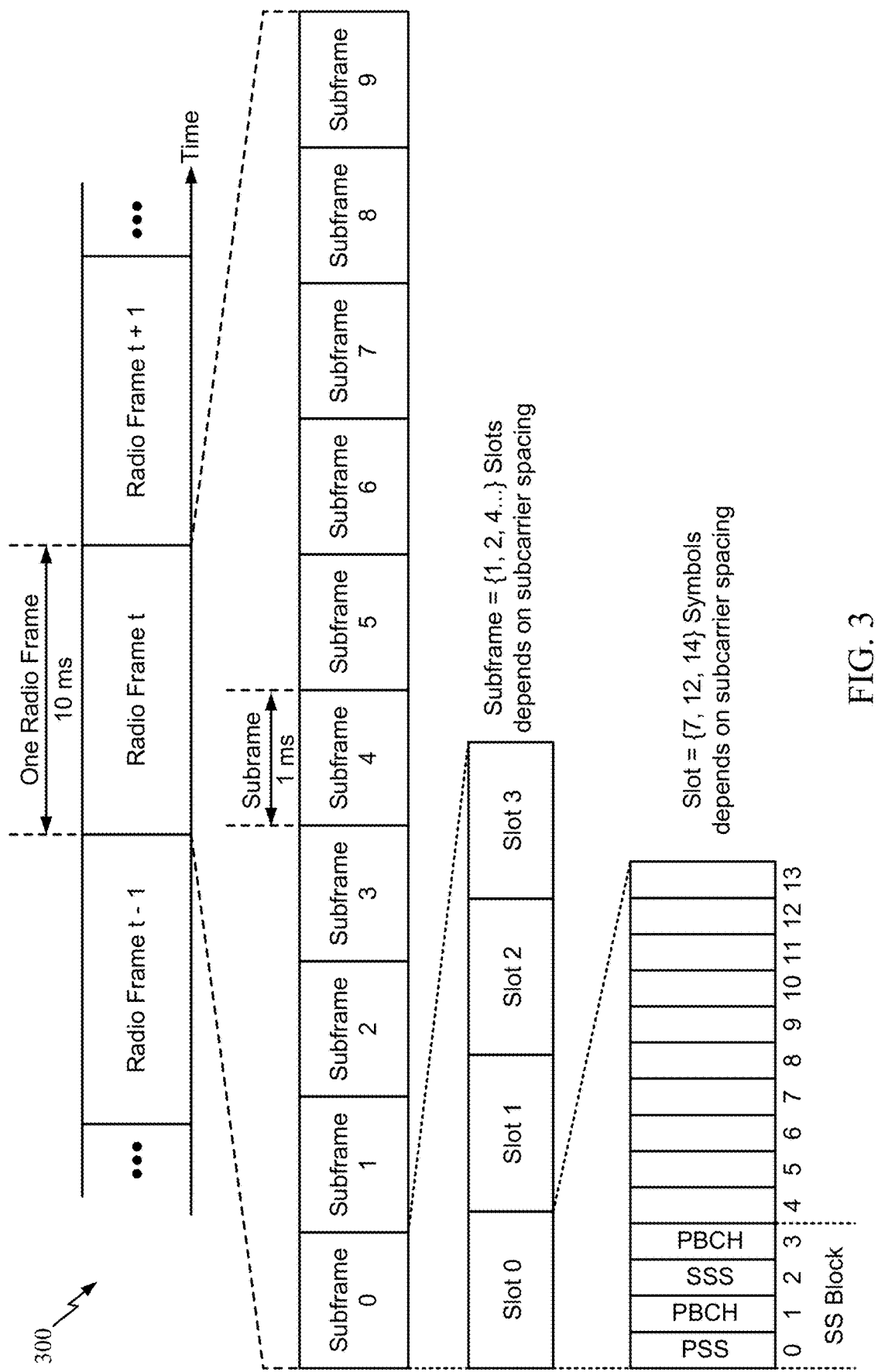
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
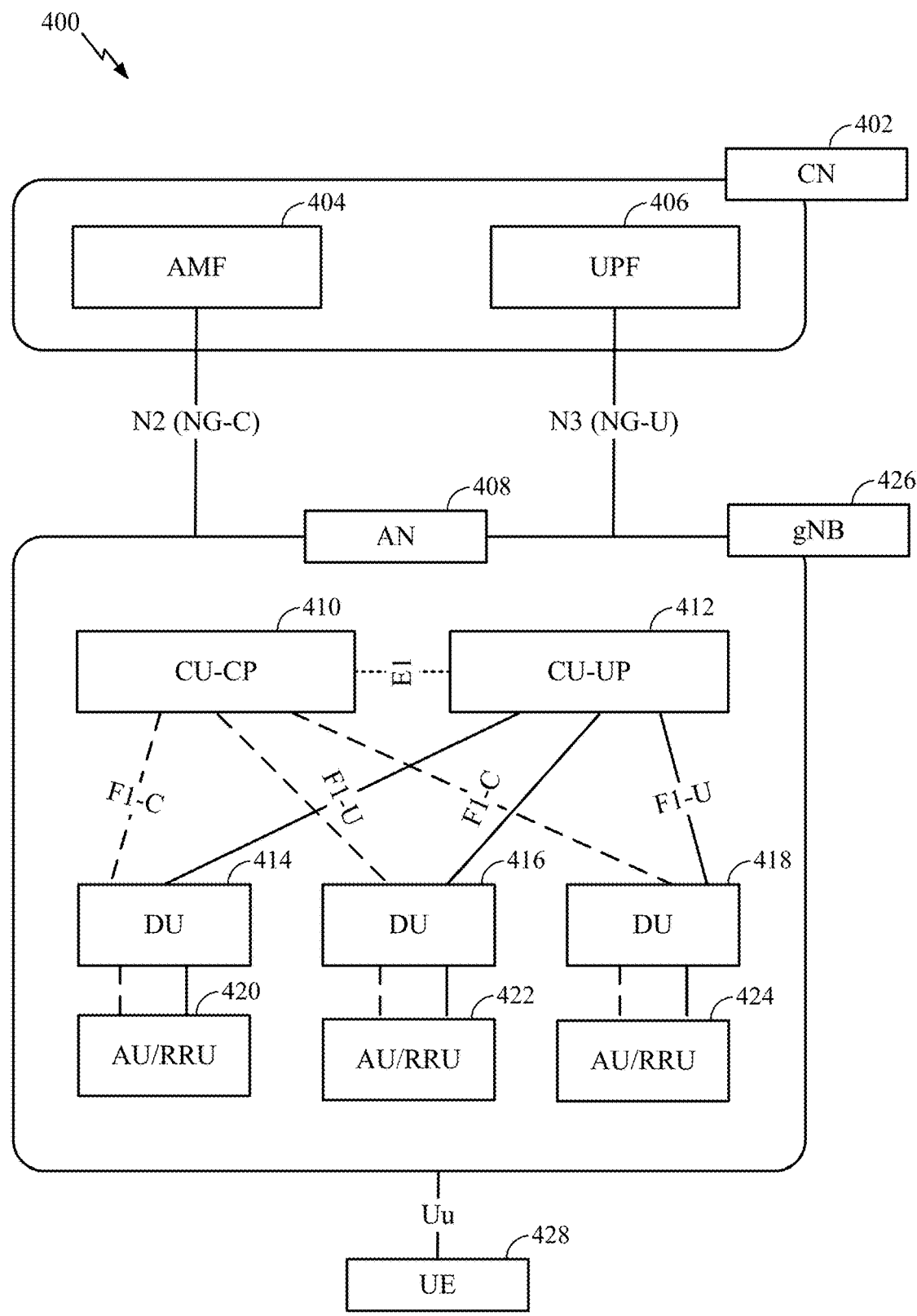
FIG. 4 is a block diagram illustrating an example architecture of a distributed RAN, in accordance with certain aspects of the present disclosure.

FIG. 4 illustrates an example architecture of a distributed RAN 400, which may be implemented in the wireless communication network 100 illustrated in FIG. 1. As shown in FIG. 4, the distributed RAN 400 includes CN 402 and access node 408.

The CN 402 may host core network functions. CN 402 may be centrally deployed. CN 402 functionality may be offloaded (e.g., to advanced wireless services (AWS)), in an effort to handle peak capacity. The CN 402 may include the Access and Mobility Management Function (AMF) 404 and User Plane Function (UPF) 406. The AMF 404 and UPF 406 may perform one or more of the core network functions.

The AN 408 may communicate with the CN 402 (e.g., via a backhaul interface). The AN 408 may communicate with the AMF 404 via an N2 (e.g., NG-C) interface. The AN 408 may communicate with the UPF 406 via an N3 (e.g., NG-U) interface. The AN 408 may include a central unit-control plane (CU-CP) 410, one or more central unit-user plane (CU-UPs) 412, one or more distributed units (DUs) 414-418, and one or more Antenna/Remote Radio Units (AU/RRUs) 420-424. The CUs and DUs may also be referred to as gNB-CU and gNB-DU, respectively. One or more components of the AN 408 may be implemented in a gNB 426. The AN 408 may communicate with one or more neighboring gNBs.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the AN 408 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-CP(s) 410 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP.

A DU, such as DUs 414, 416, and/or 418, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of AU/RRUs 420-424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using Bearer Context Management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, AN 408 may support dual connectivity with NR and may share a common fronthaul for LTE and NR. The distributed RAN 400 may enable cooperation between and among DUs 414-418, for example, via the CU-CP 410. An inter-DU interface may not be used.

As shown in FIG. 4, the AN 408 may be in communication with one or more UEs (UE 428). For example, the AN 408 may be in communication with the UE(s) via one or more wireless access links (e.g., uU cellular interface).

Logical functions may be dynamically distributed in the distributed RAN 400. As will be described in more detail with reference to FIG. 5, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 5:
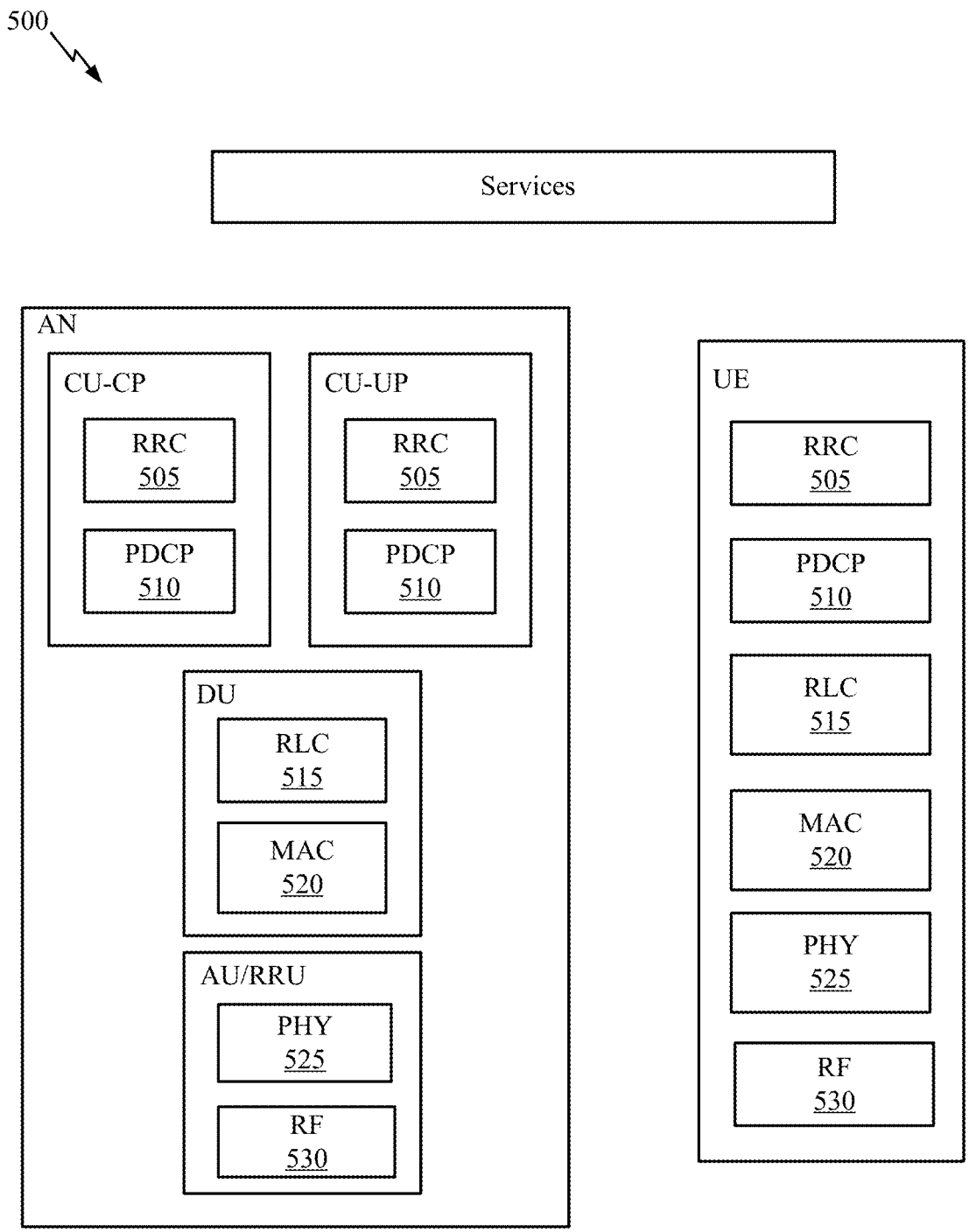
FIG. 5 is a block diagram showing examples for implementing a communication protocol stack in the example RAN architecture, in accordance with certain aspects of the present disclosure.

FIG. 5 illustrates a diagram showing examples for implementing a communications protocol stack 500 in a RAN (e.g., such as the RAN 400), according to aspects of the present disclosure. The illustrated communications protocol stack 500 may be implemented by devices operating in a wireless communication system, such as a 5G NR system (e.g., the wireless communication network 100). In various examples, the layers of the protocol stack 500 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 5, the system may support various services over one or more protocols. One or more protocol layers of the protocol stack 500 may be implemented by the AN and/or the UE.

As shown in FIG. 5, the protocol stack 500 is split in the AN (e.g., AN 408 in FIG. 4). The RRC layer 505, PDCP layer 510, RLC layer 515, MAC layer 520, PHY layer 525, and RF layer 530 may be implemented by the AN. For example, the CU-CP (e.g., CU-CP 410 in FIG. 4) and the CU-UP e.g., CU-UP 412 in FIG. 4) each may implement the RRC layer 505 and the PDCP layer 510. A DU (e.g., DUs 414-418 in FIG. 4) may implement the RLC layer 515 and MAC layer 520. The AU/RRU (e.g., AU/RRUs 420-424 in FIG. 4) may implement the PHY layer(s) 525 and the RF layer(s) 530. The PHY layers 525 may include a high PHY layer and a low PHY layer.

The UE may implement the entire protocol stack 500 (e.g., the RRC layer 505, the PDCP layer 510, the RLC layer 515, the MAC layer 520, the PHY layer(s) 525, and the RF layer(s) 530).

Example IAB Network

As discussed above, aspects of the present disclosure are related to integrated access and backhaul (IAB) networks.

Traditional (for example, 3G, 4G, LTE) RAN may include multiple BS (for example, access nodes (AN)), where each BS communicates with a CN via a wired backhaul link, such as a fiber connection. ABS may communicate with a UE via an access link, which may be a wireless link.

In some systems, a RAN may include a wireless backhaul network. In some aspects or scenarios, a wireless backhaul network may sometimes be referred to as an integrated access and backhaul (IAB) network With the exponential rise in data-demand far exceeding the capacity of the traditional macro-only cellular network operating in sub-6 GHz bands, network densification using mmWave base stations (BSs) is becoming a major driving technology for the 5G wireless evolution. With recent advancement in mmWave communication with highly directional beamforming, it is possible to replace fibers for small BSs by establishing fixed mmWave wireless backhaul links between a small BS and a corresponding macro BS equipped with a fiber backhaul, also known as the anchored BS, thereby achieving Gigabits per second (Gbps) range datarate over the backhaul links.

An IAB network can use 5G mmWave communication to support an access network including access links between access nodes (ANs) and UEs, as well as a backhaul network including wireless backhaul links between ANs of the IAB network. In a typical IAB, network resources (e.g., time and/or frequency resources) are shared between the access and backhaul networks/links.

An IAB network may include multiple BSs. The BSs may be of differing types or have differing operational characteristics. For example, in some aspects, an IAB network may have at least one BS that is an anchor BS. The anchor BS may communicate with a CN via a wired backhaul link, such as a fiber connection. An anchor BS may also be referred to as an IAB donor node.

The IAB network may also include one or more non-anchor BSs. Non-anchor BSs may be referred to as relay base stations, IAB nodes, or intermediate nodes. The non-anchor BSs may communicate directly with or indirectly with (for example, via one or more other non-anchor BSs 345) the anchor BSs via one or more backhaul links to form a backhaul path to the CN for carrying backhaul traffic. The backhaul link, or backhaul channel may be a wireless link. For example, the backhaul link may be an over-the-air radio link control (RLC) channel. Anchor BS(s) or non-anchor BS(s) may communicate with one or more UEs via access links, which may be wireless links for carrying access traffic. In some aspects, an anchor BS or a non-anchor BS may correspond to a BS 110 shown in FIG. 1. Similarly, a UE may correspond to a UE 120 shown in FIG. 1.

An IAB network may utilize a variety of differing radio frequency bands. According to some aspects, millimeter wave technology or directional communications can be utilized (for example, beamforming, precoding) for communications between BSs or UEs (for example, between two BSs, between two UEs, or between a BS and a UE). Wireless backhaul links between BSs may use millimeter waves to carry information or may be directed toward a target BS using beamforming, precoding. The wireless access links between a UE and a BS may use millimeter waves or may be directed toward a target wireless node (for example, a UE or a base station). In this way, inter-link interference may be reduced.

In some aspects, an IAB network may support a multi-hop network or a multi-hop wireless backhaul. Each node of an IAB network may use the same radio access technology (for example, 5G/NR). Nodes of an IAB network may share resources for access links and backhaul links, such as time resources, frequency resources, spatial resources. Various architectures of IAB nodes or IAB donors may be supported.

In some aspects, an IAB donor may include a central unit (CU) that configures IAB nodes that access a CN via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with a BS 110 for that IAB node, and an MT of an IAB node may perform functions described in connection with a UE 120 for that IAB node.

Figure 6:
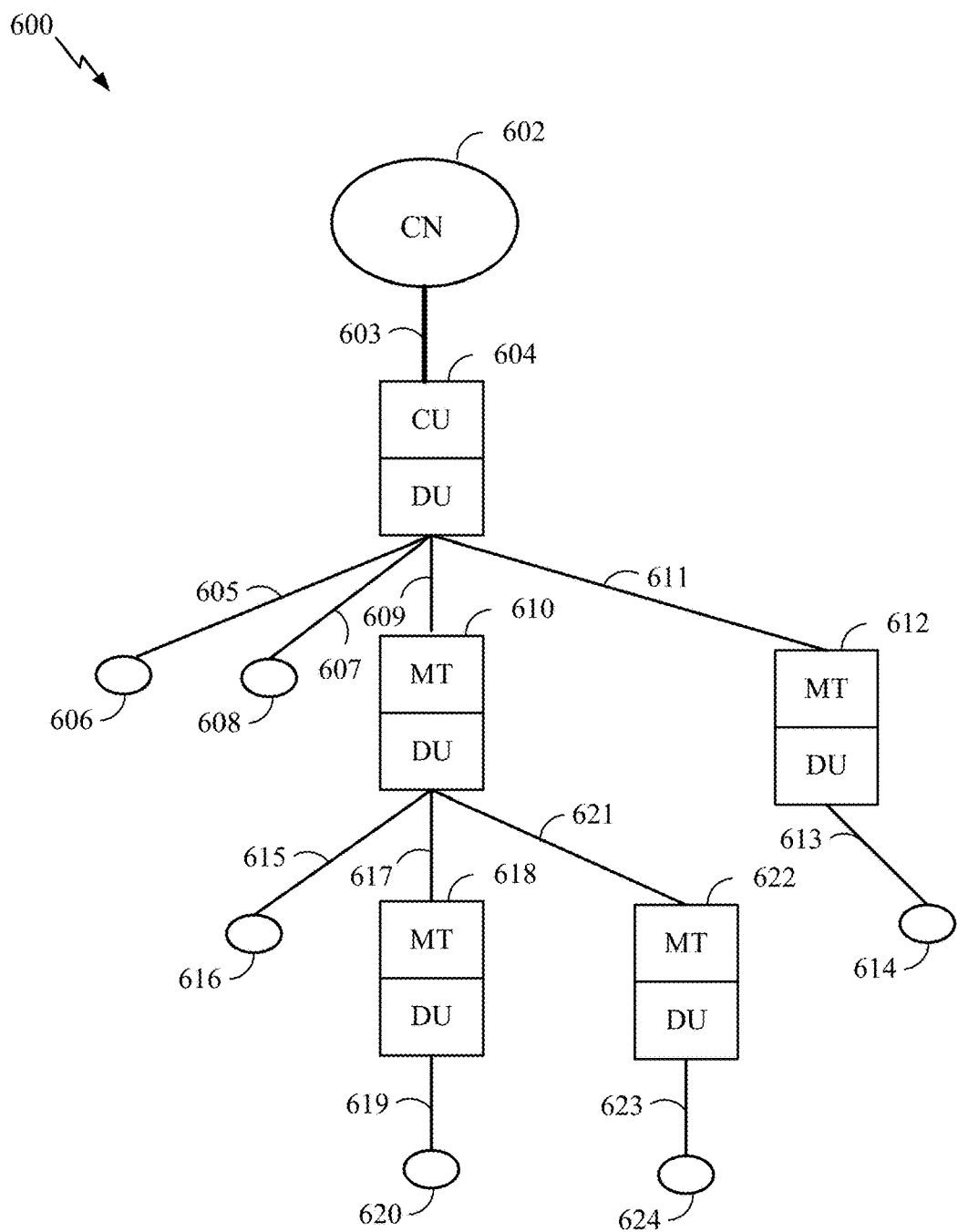
FIG. 6 is a diagram illustrating an example of an integrated access and backhaul (IAB) network architecture, in accordance with various aspects of the disclosure.

FIG. 6 is a diagram illustrating an example of an IAB network architecture 600, in accordance with various aspects of the disclosure. As shown in FIG. 6, an IAB network may include an IAB donor node 604 that connects to a core network 602 via a wired connection 603 (for example, as a wireline fiber). For example, an Ng interface of an IAB donor node 604 may terminate at the CN 602. IAB donor node 604 may connect to one or more devices of the CN 602 that provide a core access and mobility management function (AMF). In some aspects, IAB donor node 604 may include a BS 110, such as an anchor BS, as described above. As shown, IAB donor node 604 may include a CU, which may perform ANC functions or AMF functions. The CU may configure a DU of the IAB donor node 604. The CU may configure one or more IAB nodes (for example, an MT or a DU of IAB node 610 and 612) that connect to the CN 602 via the IAB donor node 604 (e.g., via the wireless backhaul links 609 and 611, respectively). An IAB donor node 604 may configure, control, or schedule UEs 606 and 608, via wireless access links 605 and 607, respectively. Thus, a CU of IAB donor node 64 may control or configure the entire IAB network that connects to the CN 602 via the IAB donor node 604, such as by using control messages or configuration messages (for example, a RRC configuration message or an F1 application protocol (FLAP) message).

As described above, the IAB network may include intermediate, non-anchor, IAB nodes (shown as IAB nodes 610, 612, 618, and 622) that connect to the CN 602 via the IAB donor node 604. As shown, an IAB node may include an MT and may include a DU. The MT of an IAB node (for example, a child node) may be controlled or scheduled by another IAB node (for example, a parent node) or by an IAB donor 604. The DU of an IAB node (for example, a parent node) may control or schedule other IAB nodes (for example, child nodes of the parent node) or UEs. Thus, a DU may be referred to as a scheduling node or a scheduling component, and an MT may be referred to as a scheduled node or a scheduled component. As shown, the IAB node 610 may control or schedule the UE 616 (via wireless access link 615) and IAB nodes 618 and 622 (via wireless backhaul links 617 and 621, respectively); the IAB node 612 may schedule or control the UE 614 (via wireless access link 613); and the IAB nodes 618 and 622 may schedule or control the UEs 620 and 624, respectively (via the wireless access links 619 and 623, respectively).

A UE may include only an MT, and not a DU. That is, communications of a UE may be controlled or scheduled by an IAB donor node 604 or an IAB node (for example, a parent node of the UE).

When a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor node or an IAB node, and a child node may be an IAB node or a UE.

As shown in FIG. 6, a link between a UE and an IAB donor node, or between a UE and an IAB node, may be referred to as an access link (e.g., access links 605, 607, 613, 615, 619, 623). Each access link may be a wireless access link that provides a UE with radio access to CN 402 via the IAB donor node 604, and potentially via one or more intermediate IAB nodes.

As shown in FIG. 6, a link between an IAB donor node 604 and an IAB node, or between two IAB nodes, may be referred to as a backhaul link (e.g., backhaul links 609, 611, 617, 621). Each backhaul link may be a wireless backhaul link that provides an IAB node with radio access to CN 602 via the IAB donor node 604, and potentially via one or more other intermediate IAB nodes. In some aspects, a backhaul link may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links and backhaul links.

As described herein, an IAB donor may be a gNB with functions to control the IAB-network and may include a CU and DU(s). As described with respect to FIG. 4, a CU may include a CU-CP and CU-UP which may have an E1 interface, the CU-CP and the gNB DU(s) may have an F1-C interface, and the CU-UP and gNB DU(s) may have an F1-U interface. The CU may perform RRC and/or PDCP layer functions. The DU may be a scheduling node that schedules child nodes of this IAB-donor. The DU may perform RLC/MAC/PHY layer functions. An IAB-node is a layer-2 (L2) relay node including MT and DU functions, as described herein. The MT is a scheduled node similar to a UE scheduled by its parent IAB-node or IAB-donor and the DU is a scheduling node that schedules child nodes of this IAB-node.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

In an IAB layer 2 (L2) structure, access RLC channels may be between a DU and a UE to carry PDCP for RRC or DRB, and/or between a DU and MT to carry PDCP for RRC or DRB. Backhaul RLC channels may be between a DU and MT to carry BAP for backhauling of access traffic.

Figure 7:
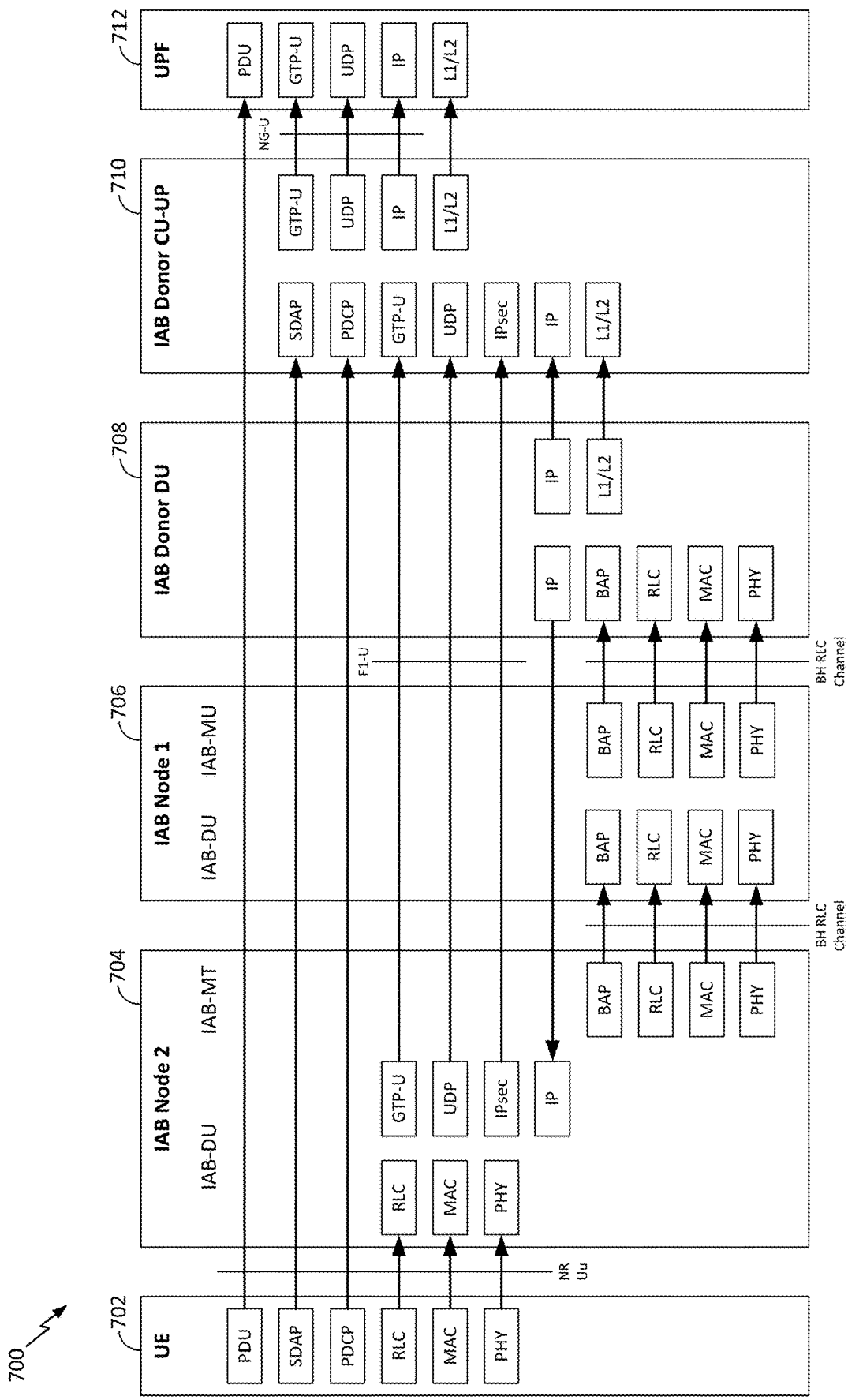
FIG. 7 is a block diagram showing examples for implementing a user-plane communication protocol stack in the example TAB architecture, in accordance with certain aspects of the present disclosure.

FIG. 7 is a block diagram showing examples for implementing a user-plane communication protocol stack 700 in the example IAB architecture, in accordance with certain aspects of the present disclosure. The user-plane communication protocol stack 700 is shown for a UE 702, two-intermediate nodes 704 and 706 (IAB nodes 1 and 2), an IAB donor DU 708, an IAB donor CU-UP 710, and a UPF 712.

The UPF 712 may be in a core network (e.g., CN 602, 402, 132 illustrated in FIGS. 6, 4, 2, respectively). The UPF 712 may have an NG-U interface with the IAB donor CU-UP 710. As shown in FIG. 7, the UPF 712 may include a protocol data unit (PDU) layer, a GPRS tunneling protocol (GTP-U) layer, a user datagram protocol (UDP) layer, an Internet protocol (IP) layer, and a layer 1/layer 2 (L1/L2).

As shown in FIG. 7, the IAB donor CU-UP 710 may have a GTP-U layer, a UDP layer, L1/L2, a service data adaptation protocol (SDAP) layer, a PDCP layer, and an IPsec layer. The IAB donor DU 708 may have an IP layer, L1/L2, a backhaul adaptation protocol (BAP) layer, an RLC layer, a MAC layer, and a PHY layer. The IAB donor DU 708 may have an F1-U interface with an intermediate IAB node, IAB node 1 706. The IAB node 706 may include BAP, RLC, MAC, and PHY layers. The IAB node 706 may have a BH RLC channel with another intermediate IAB node, IAB node 2 704. The IAB node 704 may include GTP-U, UDP, IPsec, IP, BAP, RLC, MAC, and PHY layers. The IAB node 704 may have an NR-Uu link with the UE 702. The UE 702 may include PDU, SDAP, PDCP, RLC, MAC, and PHY layers.

Figure 8:
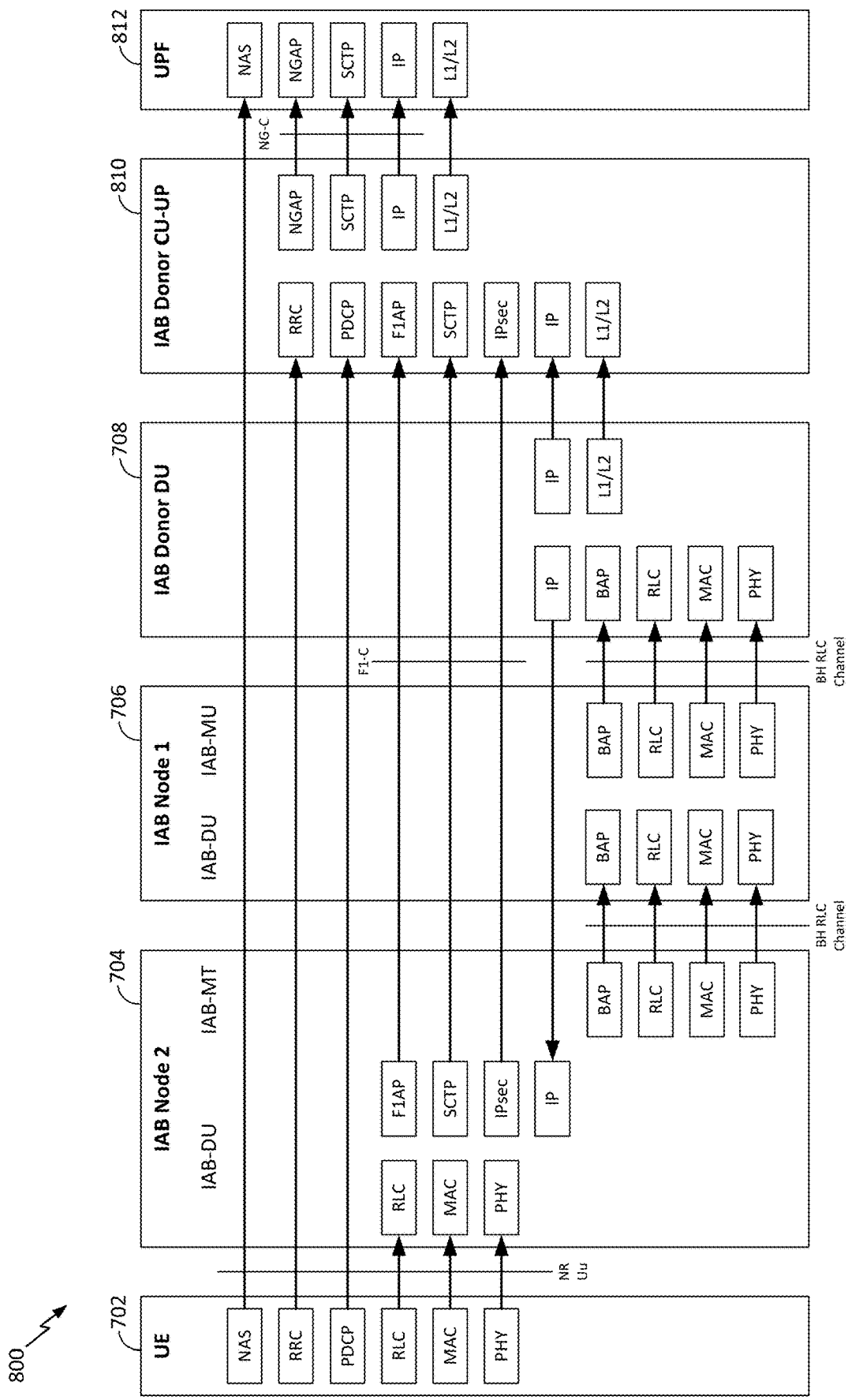
FIG. 8 is a block diagram showing examples for implementing a control-plane communication protocol stack in the example TAB architecture, in accordance with certain aspects of the present disclosure.

FIG. 8 is a block diagram showing examples for implementing a control-plane communication protocol stack 800 in an example IAB architecture, in accordance with certain aspects of the present disclosure. The control-plane communication protocol stack 800 is shown for a UE 702, two-intermediate nodes 704 and 706 (IAB nodes 1 and 2), an IAB donor DU 708, an IAB donor CU-CP 810, and an AMF 812.

The AMF 812 may be in a core network (e.g., CN 602, 402, 132 illustrated in FIGS. 6, 4, 2, respectively). The AMF 812 may have an NG-C interface with the IAB donor CU-CP 810. As shown in FIG. 8, the AMF 812 may include a non-access stratum (NAS) layer, an NG application protocol (NGAP) layer, a session control protocol (SCP) layer, an IP layer, and L1/L2. As shown in FIG. 8, the IAB donor CU-CP 810 may have an NGAP, session control transmission protocol (SCTP), IP, L1/L2, RRC, PDCP, and F1AP layers.

Where as in LTE, quality-of-service (QoS) is enforced at the evolved packet system (EPS) bearer level, in 5G, QoS is enforced at the QoS flow level. For example, LTE uses EPS bearers assigned an EPS bearer ID, and 5G uses 5G QoS flows each identified by a QoS flow ID (QFI). 5G supports guaranteed bit rate (GBR) and non-GBR flows, along with a new delay-critical GBR. 5G also introduces reflective QoS.

The QoS flow may be the lowest level of granularity of QoS differentiation in a protocol data unit (PDU) session within the 5G system. The QoS flow is where policy and charging are enforced. One or more service data flows (SDFs) may be transported in the same QoS flow, if they share the same policy and charging rules. All traffic within the same QoS flow receives the same treatment. Within the 5G system (5GS), a QoS flow is controlled by the 5G session management function (SMF) and may be preconfigured, or established via the PDU session establishment procedure or the PDU session modification procedure. A QoS flow is characterized by a QoS profile provided by the SMF, one or more QoS rules (and optionally QoS flow level QoS parameters associated with the QoS rules), and one or more uplink and downlink packet delivery ratio (PDR). A QoS flow associated with the default QoS rule is established for a PDU session and remains established throughout the lifetime of the PDU session.

5G QoS identifier (5QI) values provide QoS characteristics (e.g., resource type, priority level, packet delay budget (PDB), packet error rate (PER), default maximum data burst volume, default averaging window, example services). An illustrative example of 5QI values mapped to QoS characteristics is provided in Table 5.7.4-1 of 3GPP TS 23.501.

One or more QoS flows can be mapped to a data radio bearer (DRB), for example at the SDAP layer. In some systems, such as Rel-16 5G NR, QoS information is provided by the CU to a serving DU for a UE per DRB and per QoS flow via the F1-AP interface. A UE context setup message, such as over the F1-AP interface, may include QoS information and/or time sensitive communications (TSC) as provided, for example, in TS 38.473, Section 9.2.2.1; QoS flow level QoS parameters IE as provided in TS 38.473, Section 9.3.1.45; dynamic 5QI descriptor as provided TS 38.473, Section 9.3.1.47; and/or non-dynamic 5QI descriptor as provided TS 38.473, Section 9.3.1.49.

Figure 9:
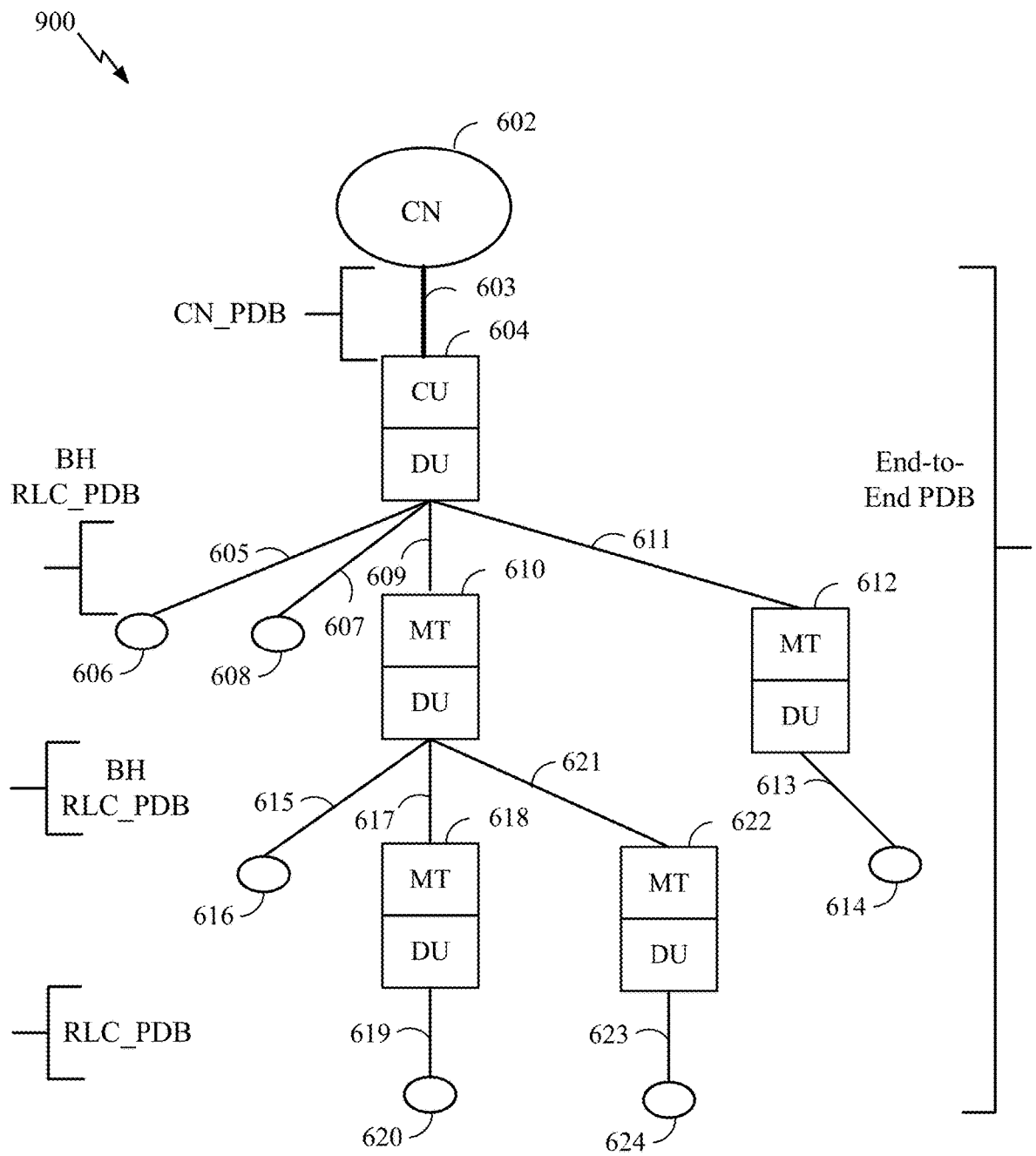
FIG. 9 illustrates packet delay budgets (PDB) for an TAB network, in accordance with certain aspects of the present disclosure.

As shown in FIG. 9, an end-to-end PDB may be between the UPF (e.g., terminating at the N6 interface) and the UE. As shown in FIG. 9, a core network PDB (CN_PDB) may be defined/indicated between the core network 602 (e.g., the UPF terminating at the N6 interface) and the 5G-AN (e.g., the IAB donor node 604). The CN_PDB can be a static value defined by 5QI or dynamically configured by the CU via F1-AP. For example, TS 23.501, Section 5.7.3.4, defines PDB as the upper bound for the time that a packet may be delayed between the UE and the UPF that terminates the N6 interface. For a certain 5QI the value of the PDB is the same in UL and DL. In the case of 3GPP access, the PDB is used to support the configuration of scheduling and link layer functions (e.g. the setting of scheduling priority weights and HARQ target operating points). The 5G Access Network Packet Delay Budget (5G-AN PDB) is determined by subtracting a static value for the Core Network Packet Delay Budget (CN PDB), which represents the delay between any UPF terminating N6 (that may possibly be selected for the PDU Session) and the 5G-AN from a given PDB. For a standardized 5QI, the static value for the CN PDB can be specified in the QoS characteristics TS 23.501, Table 5.7.4-1. For a non-standardized 5QI, the static value for the CN PDB can be homogeneously configured in the network.

In IAB networks (e.g., such as the IAB network illustrated in FIG. 9), in addition to the CN-PDB and end-to-end PDB, an RLC channel PDB may be defined/indicated for each BH RLC channel. The end-to-end PDB may be provided to serving nodes. The BH RLC PDB may be provided to each intermediate IAB-DU. The RLC PDB may be define the delay upper bound between the IAB-DU and child-MT, as shown in FIG. 9. The end-to-end PDB, CN_PDB, and RLC_PDB may be provided per DRB and per QoS flow.

Assistance information can be exchanged between nodes. For example, TS 38.425, FIG. 5.5.2.3-1 shows assistance information data format. TS 38.425, Sections 5.5.3.38, 5.5.3.39, 5.5.3.48, and 5.5.3.49 provides certain assistance information type and radio quality assistance information in an NG-RAN. TS 38.425, Sections 5.6.3.5 and 5.5.3.6 provides for a desired buffer size for a DRB and a desired data rate.

In some IAB systems, for the QoS flow or the DRB, ensuring the end-to-end PDB to the IAB nodes is a key target. In a baseline (or a centralized) method, the CU (for example, the CU illustrated in FIG. 6 or the IAB donor node 604 illustrated in FIG. 9) may determine the BH_RLC PDBs of the BH RLC channels for each IAB node (for example, the IAB-DU and the child-MT illustrated in FIG. 9) so that the end-to-end PDBs of the QoS flows can be guaranteed. The IAB donor node CU may determine the BH_RLC PDB for the BH RLC channel between the two IAB nodes (for example, the IAB-DU and the child-MT illustrated in FIG. 9) based on the end-to-end PDBs of the QoS flows aggregated into the BH RLC channel, topology information (for example, a number of hops), and/or information associated with each IAB node (for example, an average link quality and/or buffer loading at each IAB node).

However, depending on instantaneous BH RLC channel condition, packets may be delivered earlier or later than the BH_RLC PDB for the BH RLC by an intermediate IAB node. Also depending on the buffer loading at each IAB node, the packets may be delivered earlier or later than the BH_RLC PDB for the BH RLC by the intermediate IAB node. Depending on the BH RLC channel condition as well as the buffer loading at each IAB-node, the packets may be delivered earlier or later than the BH_RLC PDB for the BH RLC by the intermediate IAB node.

In some cases, a DU (e.g., a DU of FIG. 9), may use hard resources unconditionally. In certain aspects, the DU may not be permitted to use a not available resource unless the DU matches an allocation for any of a SSB transmission (e.g., both cell-defining (CD) SSB and non-CD-SSB), a RACH reception, periodic CSI-RS transmission(s), and/or SR reception. In some cases, the DU may use a soft resource based on one or more conditions. For example, a parent node may send an explicit indication to release the resource. As another example, the node may implicitly determine that the use of the DU resource has no impact on what the MT is expected to do. In some cases, the same exception as for the not available case may apply on cell specific signals/channels.

In general, a TSC traffic pattern may be periodic and/or deterministic. A TSC traffic pattern may be provided by the core network, such as by a session management function (SMF), to a gNB via an access management function (AMF) during a QoS flow establishment for efficient scheduling. For example, assistance information may be provided, including a flow direction of the TSC flow (e.g., uplink or downlink), a periodicity (e.g., a time between a start of two bursts), and/or a burst arrival time (e.g., the arrival time at ingress of RAN of egress of UE). For example, assistance information may be provided as described in more detail in Table 5.27.2-1 of TS 38.413.

In some cases, a TSC QoS Flow may use a delay critical GBR type. Further, the PDB may be split into a 5G-AN PDB and CN PDB. For determination of burst arrival time, the CN PDB may be used.

Figure 10:
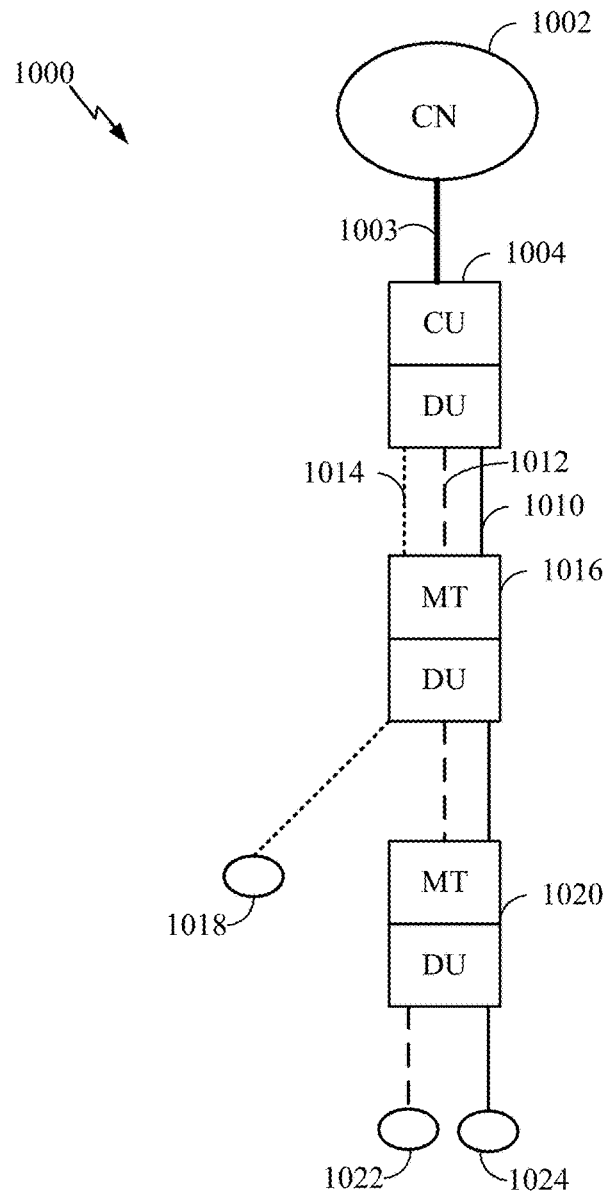
FIG. 10 illustrates an example TAB network with time sensitive communications (TSC) traffic, in accordance with certain aspects of the present disclosure.
Figure 10:
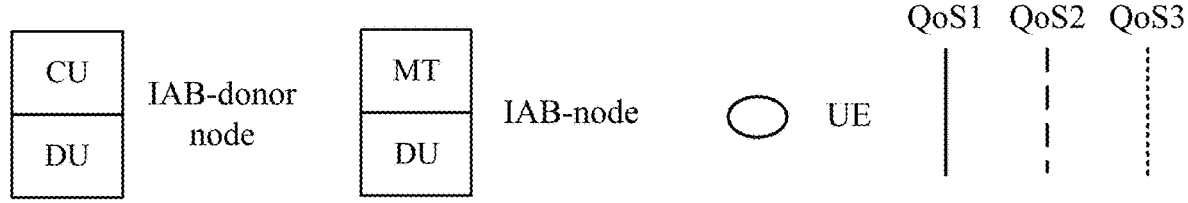

FIG. 10 illustrates an example IAB network 1000 with time sensitive communications (TSC) traffic. As shown, a CN 1002 may be connected to an IAB donor node 1004 via a wired connection (e.g., as a wireline fiber). The IAB donor node may be configured with multiple QoS flows 1010, 1012, and 1014. The QoS flows 1010, 1012, and 1014 may also be referred to herein as QoS1, QoS2, and QoS3, respectively. In the example shown, QoS1 may be a TSC flow, while QoS2 and QoS3 may be non-TSC flows. As shown, QoS3 may be directed to a UE 1018 via the IAB parent node 1016. The QoS1 and QoS2 may be directed to an intermediate IAB node 1020, which then forwards the QoS1 and QoS2 to UEs 1024 and 1022, respectively.

In some cases, a CU of the IAB donor node 1004 knows the particular QoS/TSC flow of all UEs and/or MTs. The CU of the IAB donor node 1004 may configure QoS for all BH RLCs. In some examples, the intermediate DUs (e.g., of the IAB parent node 1016 and the intermediate IAB node 1020) do not know the QoS/TSC flow of the UE 1024. However, the intermediate DUs may know configured QoS for BH RLC. Only the serving DU may know the QoS/TSC flow of the UE (e.g., UE 1024).

Figure 11:
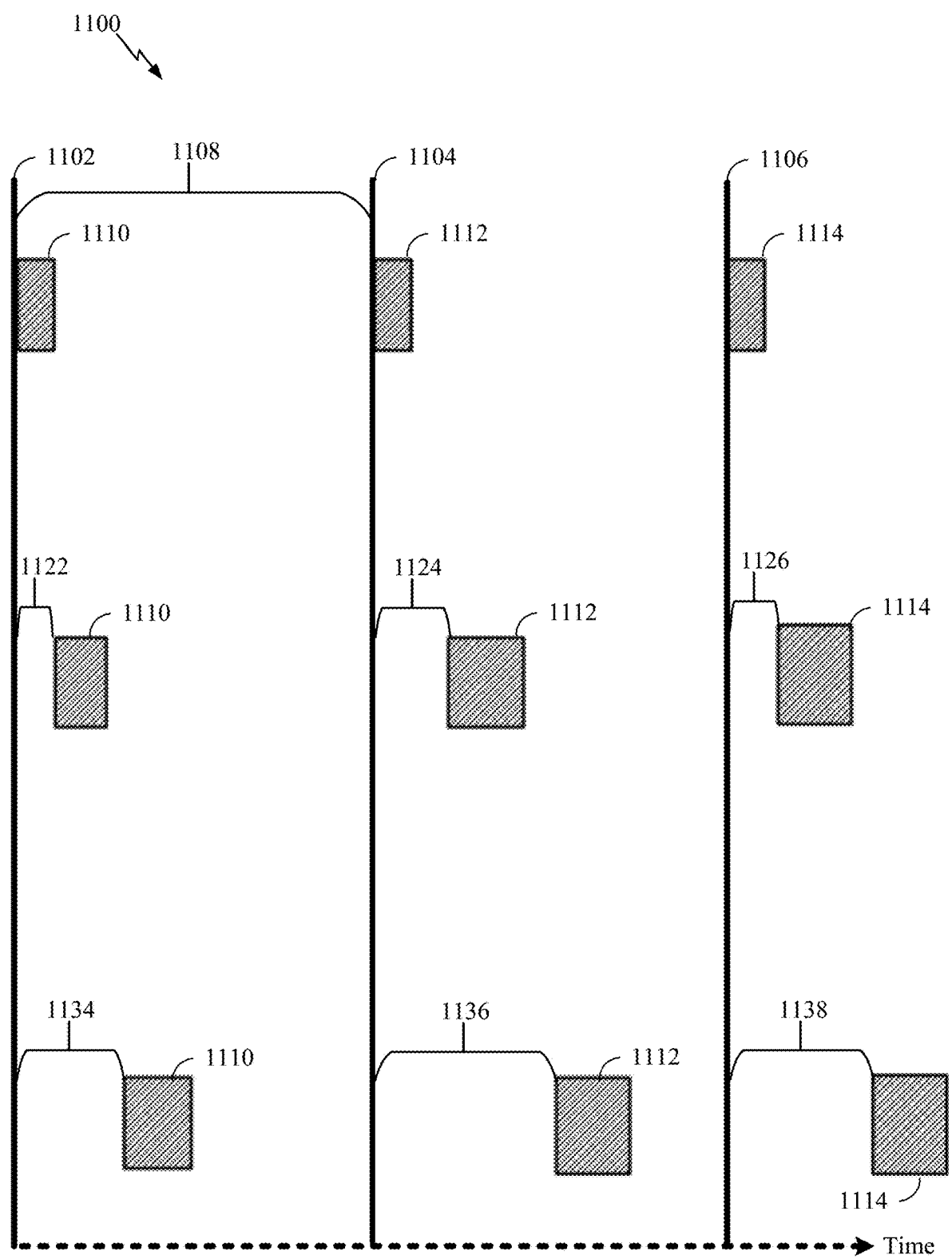
FIG. 11 illustrates an example TSC flow of a UE, in accordance with certain aspects of the present disclosure.

The arrival time of the flows at the hops in the IAB may be unknown. For example, the periodicity and arrival time may known at the IAB donor node (e.g., at the CU-UP), but unknown at the subsequent hops. FIG. 11 illustrates an example TSC flow 1100 of a UE (e.g., the UE 1024 of FIG. 10). As shown, at 1102, an IAB donor node may receive a packet 1110 scheduled for a TSC flow to the UE via IAB intermediate nodes. However, the IAB donor node may not know the latency 1122 experienced before the packet 1110 is received at the next-hop IAB node. In some cases, the arrival time (e.g., the reception of packet 1110 after latency 1122) may be based on arrival time(s) of previous hop(s) and/or HARQ status (e.g., whether the packet was initially successfully received at the previous hop or was retransmitted). Similarly, the IAB donor node may also not know the latency 1134 experienced before the packet 1110 is received by the next-hop (e.g., another intermediate IAB node or the UE). Similarly, after the periodicity 1108, another packet 1112 may be received by the IAB donor node to forward, at 1104 and after another packet 1114, at 1106. The IAB donor node may not know the latencies 1124, 1136, 1126, and 1138 associated with next hops for the packets 1112 and 1114, respectively.

A component of success for a QoS flow (or TSC flow or DRB) is to ensure the end-to-end PDB. As discussed above, the CU determines the PDB(s) of BH RLC channels for each IAB node such that end-to-end PDBs of QoS flows can be guaranteed. The determination of PDB(s) of BH RLC channels may be based on end-to-end PDBs of QoS flows aggregated into each particular RLC channel, topology information (e.g., number of hops), and/or information of each IAB node (e.g. average link quality and/or buffer loading at each IAB node). However, this centralized approach partitions an end-to-end PDB into multiple one-hop PDBs over multiple hops along the routing path when a packet may spend more (or less) time than the target one-hop PDB at a particular hop due to, for example, changes of channel conditions or traffic loading. Therefore, a dynamic approach to determining a PDB may be beneficial.

Therefore, a dynamic or flexible approach to determining the one-hop PDBs is desirable. Aspects may help provide topology-wide fairness, improve multi-hop latency, and improve congestion mitigation.

Example One-Hop PDB Coordination in an IAB Network

Aspects of the present disclosure provide techniques for dynamic coordination between integrated access and backhaul (IAB) nodes (for example, a parent IAB node and a child IAB node), to adjust a semi-statically configured one-hop packet delay budget (PDB) between the two IAB nodes, to allow for better utilization of resources and at a same time meet the end-to-end PDB. In one non-limiting example, when a packet can be delivered earlier than the semi-statically configured one-hop PDB to a next hop, the IAB node may notify a next-hop IAB-node with extra PDB to use. In another non-limiting example, if the IAB node cannot meet the semi-statically configured one-hop PDB for delivery of the packets, the IAB node may send a request to the next-hop IAB-node to borrow extra PDB to use. Aspects of the present disclosure may help provide low latency, topology-wide fairness, improve multi-hop latency, and improve congestion mitigation.

As discussed above, the IAB donor node (e.g., such as the IAB donor node 604 illustrated in FIG. 9), may determine PDBs for radio link control (RLC) channels in the IAB network. The IAB donor node may configure the PDBs for uplink (UL) and/or downlink (DL) at the IAB nodes (e.g., intermediate IAB nodes) in the IAB network. The PDBs for the RLC channels may be a one-hop PDB for each of the RLC channels. The RLC channels may include backhaul (BH) RLC channels between the intermediate IAB nodes and access RLC channels between serving IAB nodes and a user equipment (UE). An end-to-end PDB may also be configured, for example, at the serving IAB nodes. The IAB donor node may configure the one-hop PDBs to ensure that the end-to-end PDBs are achieved.

A first IAB node may coordinate with the second IAB node to adjust a target one-hop latency bound configured by a third IAB node (for example, configured by the donor CU such as the IAB donor node 604 illustrated in FIG. 9) for one or more RLC channels. In one non-limiting example, the one-hop latency bound may be a BH RLC_PDB (for example, the BH_RLC PDB illustrated in FIG. 9) over a BH RLC channel (for example, the BH_RLC channel illustrated in FIG. 9) in R16. In another non-limiting example, the one-hop latency bound may be over an access RLC channel (e.g., the access link between a serving IAB node and a UE as illustrated in FIG. 9).

The first IAB node may indicate the second IAB node to use an extra PDB than the configured one-hop latency bound for the one or more RLC channels of the second IAB node. For example, if the first IAB node can deliver packets of a RLC channel before the target one-hop latency bound due to better channel conditions or buffer loading than an average condition, the first IAB node may notify the second IAB node at a next hop with the extra PDB to use.

The first IAB node may send a request to the second IAB node to borrow an extra PDB from the second IAB node beyond its own configured one-hop latency bound. For example, if the first IAB node cannot meet its configured one-hop latency bound due to worse channel conditions or buffer loading than an average condition, the first IAB node may generate and send the request to the second IAB node to borrow the PDB from the second IAB node. In response to the received request from the first IAB node, the second IAB node may send a response message back to the first IAB node to accept or reject the request. When the second IAB node may reject the request of the first IAB node, the second IAB node may include information, such as a maximum delay budget that the second IAB node can lend to the first IAB node, in the response message to the first IAB node.

The coordination message between the first IAB node and the second IAB node may be carried by a medium access control (MAC) control element (CE), downlink (DL) physical layer control signaling (e.g., downlink control information (DCI)), uplink (UL) physical layer control signaling (e.g., uplink control information (UCI)), or a combination thereof.

Figure 12:
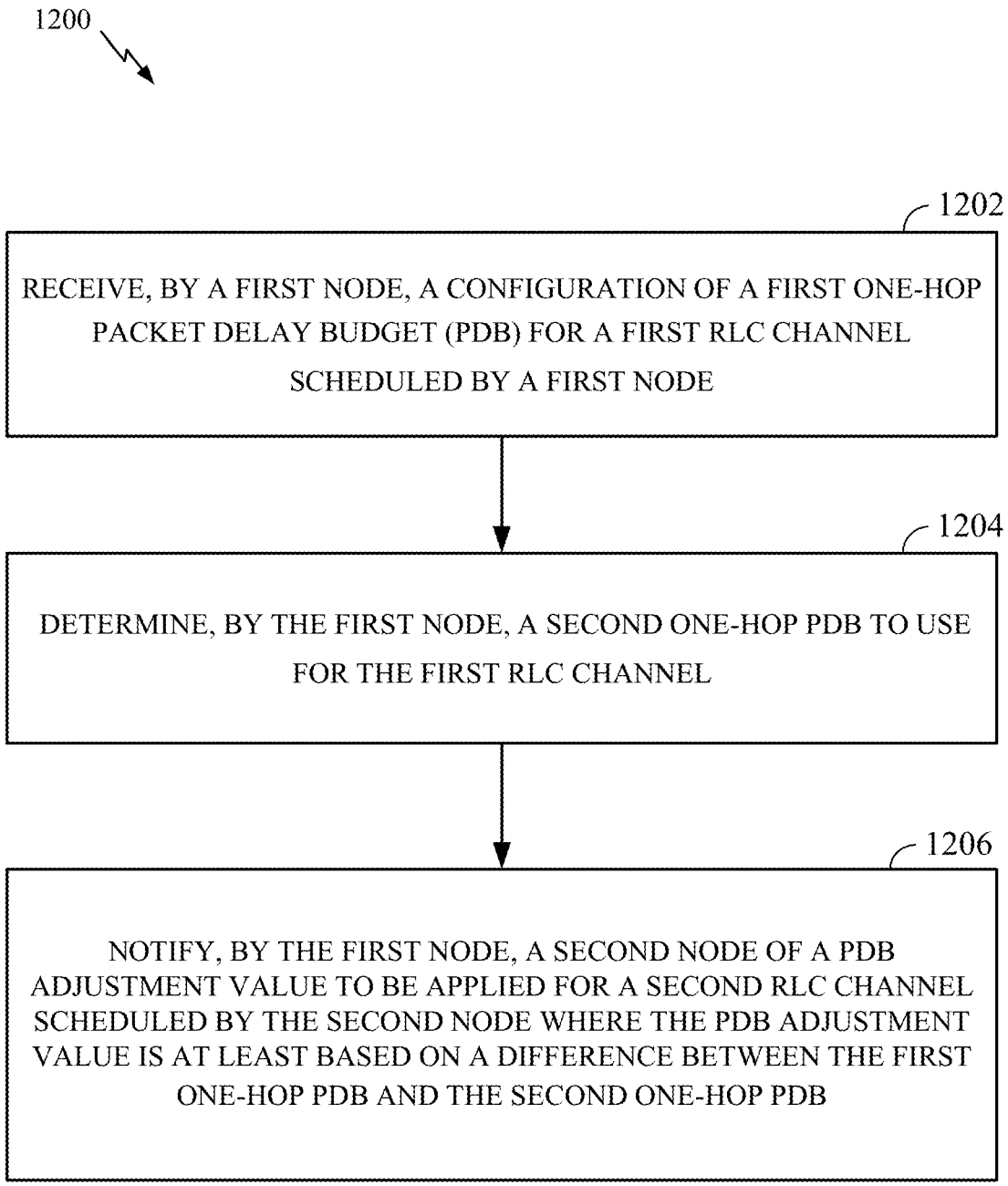
FIG. 12 is a flow diagram illustrating example operations for wireless communication by a first node, in accordance with certain aspects of the present disclosure.

FIG. 12 is a flow diagram illustrating example operations 1200 for wireless communication, in accordance with certain aspects of the present disclosure. The operations 1200 may be performed, for example, by a first node.

For downlink (DL) communications, the first node may be an IAB node (e.g., such as the BS 112a in the wireless communication network 100 of FIG. 1) or an IAB donor node (e.g., such as the BS 112a in the wireless communication network 100 of FIG. 1). The first node is associated with a second node, which is a child IAB node of the first node. The second node is associated with a third node, which is a child IAB node or a child UE of the second node. The first node may schedule a first RLC channel, which is a wireless backhaul RLC channel between the first node and the second node. The second node may schedule a second RLC channel, which is a wireless RLC channel between the second node and the third node.

For uplink (UL) communications, the first node may be an IAB node (or UE). The first node is associated with a second node, which is a parent IAB node of the first node. The first node is further associated with a third node, which is a child IAB node or a child UE of the first node. The first node may schedule the first RLC channel, which is a wireless RLC channel between the first node and the third node. The second node may schedule the second RLC channel, which is a wireless RLC channel between the second node and the first node.

The operations 1200 may be implemented as software components that are executed and run on one or more processors (e.g., controller/processor 240 of FIG. 2). Further, transmission and reception of signals by the first node in operations 1200 may be enabled, for example, by one or more antennas (e.g., antennas 234 of FIG. 2). In certain aspects, the transmission and/or the reception of the signals by the first node may be implemented via a bus interface of one or more processors (e.g., controller/processor 240) obtaining and/or outputting the signals.

The operations 1200 may begin, at 1202, by receiving a configuration of a first one-hop PDB (for example, the BH_RLC PDB illustrated in FIG. 9) for a first RLC channel (for example, the BH RLC channel illustrated in FIG. 9) scheduled by the first node. The configuration of the first one-hop RLC channel PDB is semi-static. As discussed earlier, for the DL communications, the RLC channel scheduled by the first node is the wireless backhaul RLC channel between the first node and the second node. For the UL communications, the RLC channel scheduled by the first node is the wireless RLC channel between the first node and the third node.

At 1204, the first node determines a second one-hop PDB to use for the first RLC channel.

In some examples, the first node determines the second one-hop PDB by dynamically adjusting the first one-hop PDB based on one or more channel conditions of the first RLC channel. In another instance, the first node determines the second one-hop PDB by dynamically adjusting the first one-hop PDB based on buffer loading at the first node. In another instance, the first node determines the second one-hop PDB by dynamically adjusting the first one-hop PDB based on the one or more channel conditions of the first RLC channel, the buffer loading at the first node, or a combination thereof.

The first node determines the second one-hop PDB to use for the first RLC channel on occurrence of one or more events.

In some examples, the first node determines the second one-hop PDB to use for the first RLC channel when the first node determines that the first node is able to deliver packets over the first RLC channel sooner than the configured first one-hop PDB. In one non-limiting example, the first node is able to deliver the packets over the first RLC channel sooner than the configured first one-hop PDB because of better channel conditions than an average condition. In another non-limiting example, the first node is able to deliver the packets over the first RLC channel sooner than the configured first one-hop PDB because of better buffer loading at the first node than an average condition. In another non-limiting example, the first node is able to deliver the packets over the first RLC channel sooner than the configured first one-hop PDB because of the better channel conditions as well as the better buffer loading than the average condition.

In some examples, the first node determines the second one-hop PDB to use for the first RLC channel when the first node determines that the first node is unable to deliver the packets over the first RLC channel within the configured first one-hop PDB. In one non-limiting example, the first node is unable to deliver the packets over the first RLC channel within the configured first one-hop PDB because of worse channel conditions than an average condition. In another non-limiting example, the first node is unable to deliver the packets over the first RLC channel within the configured first one-hop PDB because of worse buffer loading at the first node than an average condition. In another non-limiting example, the first node is unable to deliver the packets over the first RLC channel within the configured first one-hop PDB because of the worse channel conditions as well as the worse buffer loading than the average condition.

At 1206, the first node notifies the second node of a PDB adjustment value to be applied for a second RLC channel scheduled by the second node. The PDB adjustment value is a value of the PDB based on a difference between the first one-hop PDB and the second one-hop PDB.

In some examples, when the first node determines that the first node is able to deliver the packets over the first RLC channel sooner than the configured first one-hop PDB, the first node notifies the second node of the PDB adjustment value indicating that extra PDB is available for use by the second node for the second RLC channel scheduled by the second node. The notification from the first node to the second node is carried by a MAC CE, a DL physical layer control signaling, and an UP physical layer control signaling, or a combination thereof. In one non-limiting example, the extra PDB is available for use by the second node for an UL communication at the RLC channel between the second node and the first node. In another non-limiting example, the extra PDB is available for use by the second node for a DL communication at the RLC channel between the second node and the third node.

In some examples, when the first node determines that the first node is unable to deliver packets over the first RLC channel within the configured first one-hop PDB, the first node notifies the second node of the PDB adjustment value along with a message requesting to borrow the PDB adjustment value. The message from the first node to the second node is carried by the MAC CE, the DL physical layer control signaling, and the UP physical layer control signaling, or a combination thereof. The second node receives the request within the message from the first node. The second node accepts or rejects the request. The second node sends a response to the first node accepting or rejecting the request. The response from the second node to the first node is carried by the MAC CE, the DL physical layer control signaling, and the UP physical layer control signaling, or a combination thereof. When the second node rejects the request of the first node, the response from the second node to the first node indicates a maximum value of the PDB that the second node can lend to the first node.

The PDB is associated with a quality-of-service (QoS) flow and a data radio bearer (DRB) for the wireless access RLC channel. The PDB is also associated with the QoS flow and the DRB for the wireless backhaul RLC channel.

Figure 13:
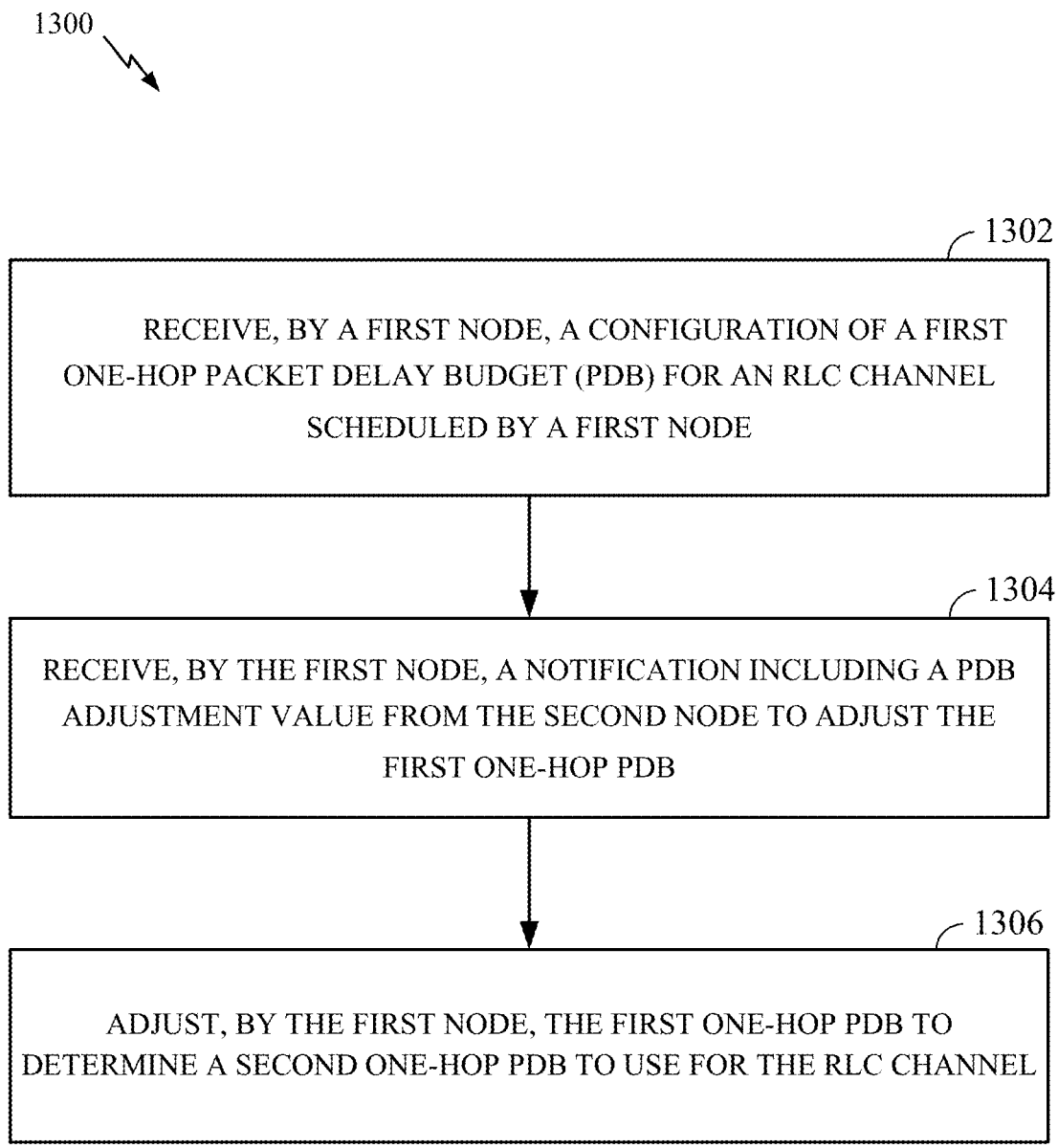
FIG. 13 is a flow diagram illustrating example operations for wireless communication by a first node, in accordance with certain aspects of the present disclosure.

FIG. 13 is a flow diagram illustrating example operations 1300 for wireless communication, in accordance with certain aspects of the present disclosure. The operations 1300 may be performed, for example, by a first node. The first node is an IAB node (e.g., such as the BS 130a in the wireless communication network 100 of FIG. 1).

For DL communications, the first node is associated with a second node, which is a parent IAB node of the first node. The first node is associated with a third node, which is a child IAB node or a child UE of the second node. The first node may schedule a RLC channel, which is a wireless backhaul RLC channel between the first node and the third node.

For UL communications, the first node is associated with the second node, which is a child IAB node of the first node. The second node is further associated with a third node, which is a child IAB node or a child UE of the second node. The first node may schedule the RLC channel, which is a wireless RLC channel between the first node and the second node.

The operations 1300 may be implemented as software components that are executed and run on one or more processors (e.g., controller/processor 240 of FIG. 2). Further, transmission and reception of signals by the first node in operations 1300 may be enabled, for example, by one or more antennas (e.g., antennas 234 of FIG. 2). In certain aspects, the transmission and/or the reception of the signals by the first node may be implemented via a bus interface of one or more processors (e.g., controller/processor 240) obtaining and/or outputting the signals.

The operations 1300 may begin, at 1302, by receiving a configuration of a first one-hop PDB (for example, the BH_RLC PDB illustrated in FIG. 9) for an RLC channel (for example, the BH RLC channel illustrated in FIG. 9) scheduled by the first node. The configuration of the first one-hop RLC channel PDB is semi-static.

At 1304, the first node receives a notification including a PDB adjustment value from the second node to adjust the first one-hop PDB. The notification from the second node to the first node is carried by a MAC CE, a DL physical layer control signaling, and a UP physical layer control signaling, or a combination thereof.

At 1306, the first node adjusts the first one-hop RLC channel PDB using the adjustment value to determine a second one-hop to use for the RLC channel. The first node adjusts the first one-hop RLC channel PDB based on the PDB adjustment value received from the second node, one or more channel conditions of the RLC channel, buffer loading at the first node, or a combination thereof.

In some examples, when the PDB adjustment value is associated with a positive PDB adjustment, the first node receives an extra PDB value to use for the RLC channel beyond the first one-hop PDB. In some examples, when the PDB adjustment value is associated with a negative PDB adjustment, the first node has to reduce the first one-hop PDB by the PDB adjustment value and lend the PDB adjustment value to the second node. When the first node receives a request for the negative PDB adjustment from the second node, the first node sends a response to the second node to accept or reject the request. The response indicates a maximum value of the PDB that the first node can lend to the second node when the first node rejects the request.

Figure 14:
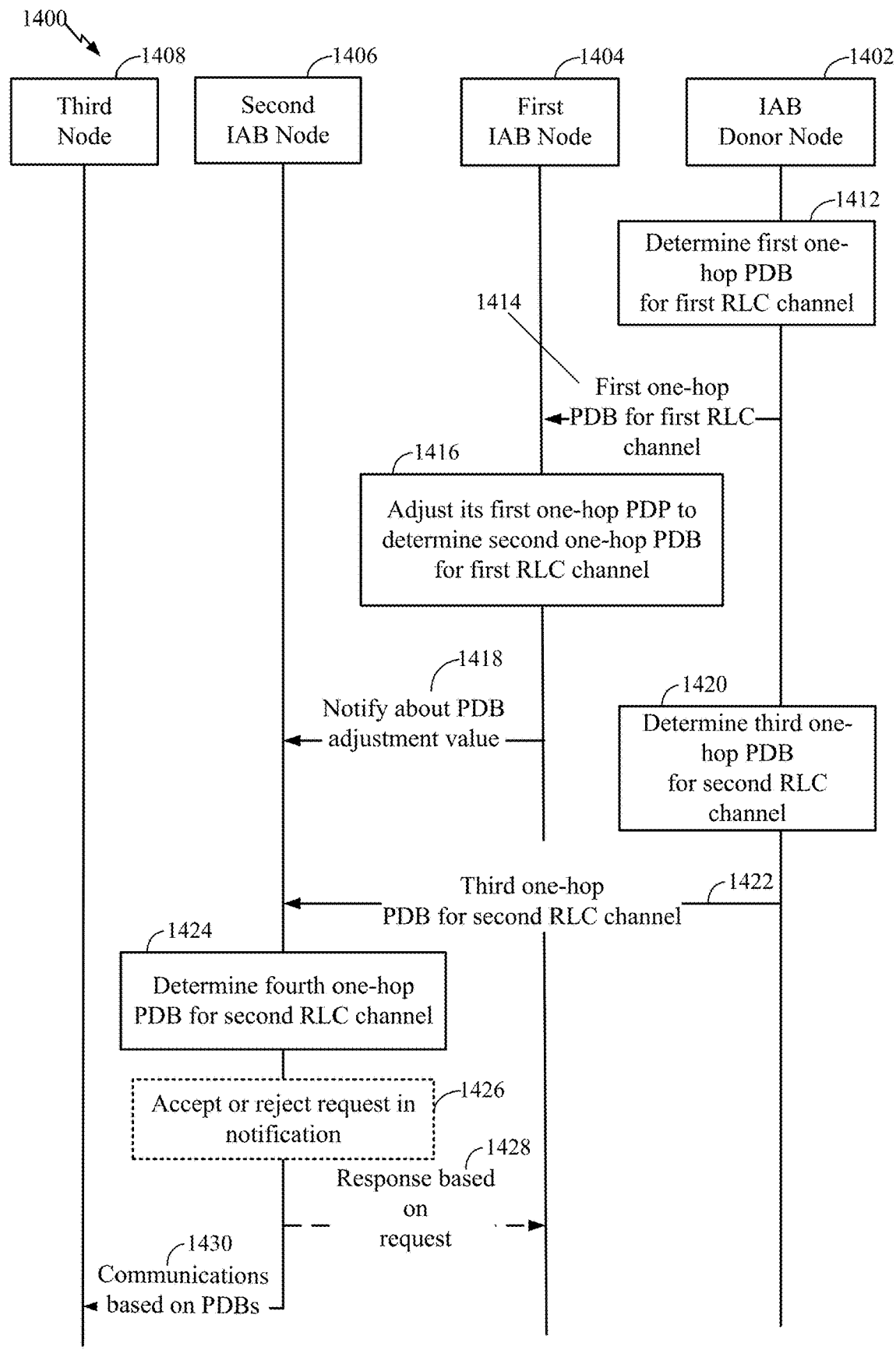
FIG. 14 is a call flow diagram illustrating example signaling for PDB coordination between multiple nodes in an TAB network for downlink (DL) communications, in accordance with aspects of the present disclosure.

FIG. 14 is a call flow 1400 illustrating example PDB coordination between multiple nodes in an IAB network for DL communications, in accordance with aspects of the disclosure. The multiple nodes may include a first IAB node 1404, a second IAB node 1406, and a third node 1408. The first IAB node 1404 is a parent IAB node of the second IAB node 1406. The second IAB node 1406 is a parent IAB node of the third node 1408.

At 1412, an IAB donor node 1402 may determine a first one-hop PDB for a first RLC channel scheduled by the first IAB node 1404 between the first IAB node 1404 and the second IAB node 1406. At 1414, the IAB donor node 1402 may send a semi-static configuration of the first one-hop PDB to the first IAB node 1404 for the first RLC channel.

At 1416, the first IAB node 1404 may adjust the first one-hop PDB to determine a second one-hop PDB for the first RLC channel. The first IAB node 1404 may then determine a PDB adjustment value, which is the difference between the first one-hop PDB and the second one-hop PDB.

At 1418, the first IAB node 1404 may send a notification to the second IAB node 1406. The notification may include the PDB adjustment value. In some examples, based on the PDB adjustment value, the notification may indicate extra PDB than the configured first one-hop PDB for the second IAB node 1406 for a second RLC channel scheduled by the second IAB node 1406 between the second IAB node 1406 and the first IAB node 1404. In some examples, the notification may include a request to borrow the PDB from the second IAB node corresponding to the PDB adjustment value.

At 1420, the IAB donor node 1402 may determine a third one-hop PDB for the second RLC channel. At 1422, the IAB donor node 1402 may send a semi-static configuration of the third one-hop PDB to the second IAB node 1406 for the second RLC channel.

At 1424, the second IAB node 1406 may adjust the third one-hop PDB to determine a fourth one-hop PDB for the second RLC channel.

When the request is included in the notification (received at 1418), at 1426, the second IAB node 1406 may accept or reject the request. At 1428, the second IAB node 1406 may send a response to the first IAB node 1404 to accept or reject the request. When the second IAB node 1406 may reject the request, the response may include information, such as a maximum amount of PDB that the second IAB node 1406 may lend to the first IAB node 1404.

At 1430, the IAB nodes 1402, 1404, 1406 may communicate over the second RLC channel based on the fourth one-hop PDB.

Figure 15:
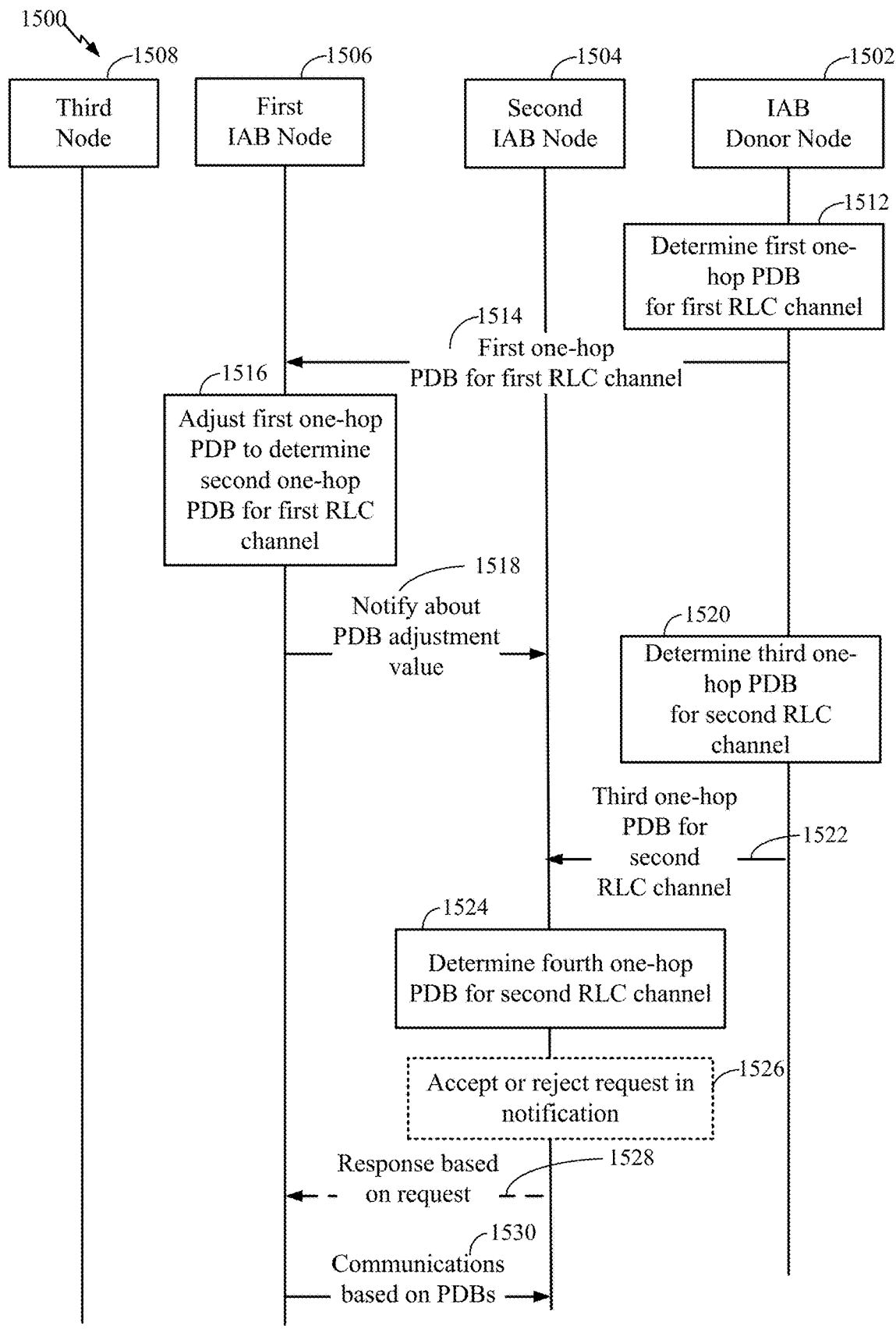
FIG. 15 is a call flow diagram illustrating example signaling for PDB coordination between multiple nodes in an TAB network for uplink (UL) communications, in accordance with aspects of the present disclosure.

FIG. 15 is a call flow 1500 illustrating example PDB coordination between multiple nodes in an IAB network for UL communications, in accordance with aspects of the disclosure. The multiple nodes may include a first IAB node 1504, a second IAB node 1506, and a third node 1508. The second IAB node 1506 is a parent IAB node of the first IAB node 1504. The first IAB node 1504 is a parent IAB node of the third node 1508.

At 1512, an IAB donor node 1502 may determine a first one-hop PDB for a first RLC channel between the third node 1508 and the first IAB node 1504. At 1514, the IAB donor node 1502 may send a semi-static configuration of the first one-hop PDB to the first IAB node 1504 for the first RLC channel.

At 1516, the first IAB node 1504 may adjust the first one-hop PDB to determine a second one-hop PDB for the first RLC channel. The first IAB node 1504 may determine a PDB adjustment value, which is the difference between the first one-hop PDB and the second one-hop PDB.

At 1518, the first IAB node 1504 may send a notification to the second IAB node 1506. The notification may include the PDB adjustment value. In some examples, based on the PDB adjustment value, the notification may indicate extra PDB available or include a request to borrow the PDB corresponding to the PDB adjustment value.

At 1520, the IAB donor node 1502 may determine a third one-hop PDB for a second RLC channel between the first IAB node 1504 and the second IAB node 1506. At 1522, the IAB donor node 1502 may send a semi-static configuration of the third one-hop PDB to the second IAB node 1506 for the second RLC channel.

At 1524, the second IAB node 1506 may adjust the third one-hop PDB to determine a fourth one-hop PDB for the second RLC channel.

When the request is included in the notification (received at 1518), at 1526, the second IAB node 1506 may accept or reject the request. At 1528, the second IAB node 1506 may send a response to the first IAB node 1504 to accept or reject the request. When the second IAB node 1506 may reject the request, the response may include information, such as a maximum amount of PDB that the second IAB node 1506 may lend to the first IAB node 1504.

At 1530, the IAB nodes 1502, 1504, 1506 may communicate on the second RLC channel based on the fourth one-hop PDB.

Figure 16:
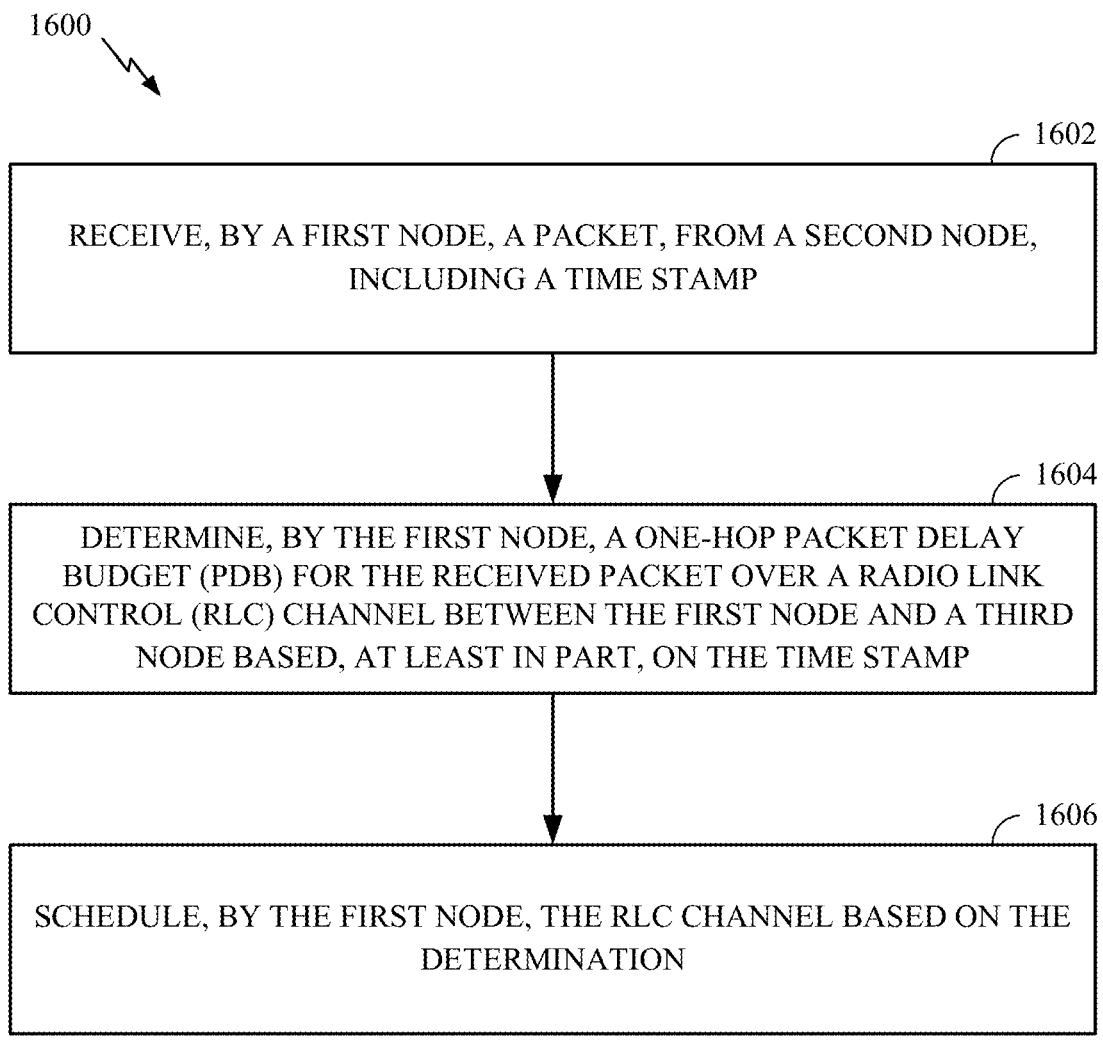
FIG. 16 is a flow diagram illustrating example operations for wireless communication by a first node, in accordance with certain aspects of the present disclosure.

Example Dynamic Determination of One-Hop
Packet Delay Budget (PDB) in an Integrated
Access and Backhaul (IAB) Node FIG. 16 is a flow diagram illustrating example operations 1600 for wireless communication, in accordance with certain aspects of the present disclosure. The operations 1600 may be performed, for example, by a first node. The first node may be an intermediate IAB node, a serving IAB node, or a UE (e.g., such as a BS 110*a* or a UE 160*a* in the wireless communication network 100). The operations 1600 may be implemented as software components that are executed and run on one or more processors (e.g., controller/processor 240 or controller/processor 280 of FIG. 2). Further, the transmission and reception of signals by the first node in operations 1600 may be enabled, for example, by one or more antennas (e.g., antennas 234 and/or antennas 252 of FIG. 2). In certain aspects, the transmission and/or reception of signals by the first node may be implemented via a bus interface of one or more processors (e.g., controller/processor 280) obtaining and/or outputting signals.

The operations 1600 may begin, at 1602, by receiving a packet, from a second node, including a time stamp. For example, an intermediate IAB node may receive a packet from a central unit (CU) on downlink. In other cases, the intermediate IAB node may receive a packet from another IAB node or a UE on uplink.

At 1604, the first node determines a one-hop PDB for the packet over an RLC channel between the first node and a third node based, at least in part, on the time stamp. For example, the first node may determine the PDB based on the time stamp and one or more additional parameters, as described further herein. Additionally, such one or more additional parameters may be received from the second node.

At 1606, the first node schedules the RLC channel based on the determination. For example, the first node may schedule the RLC channel based on the PDB determined from the time stamp.

Figure 17:
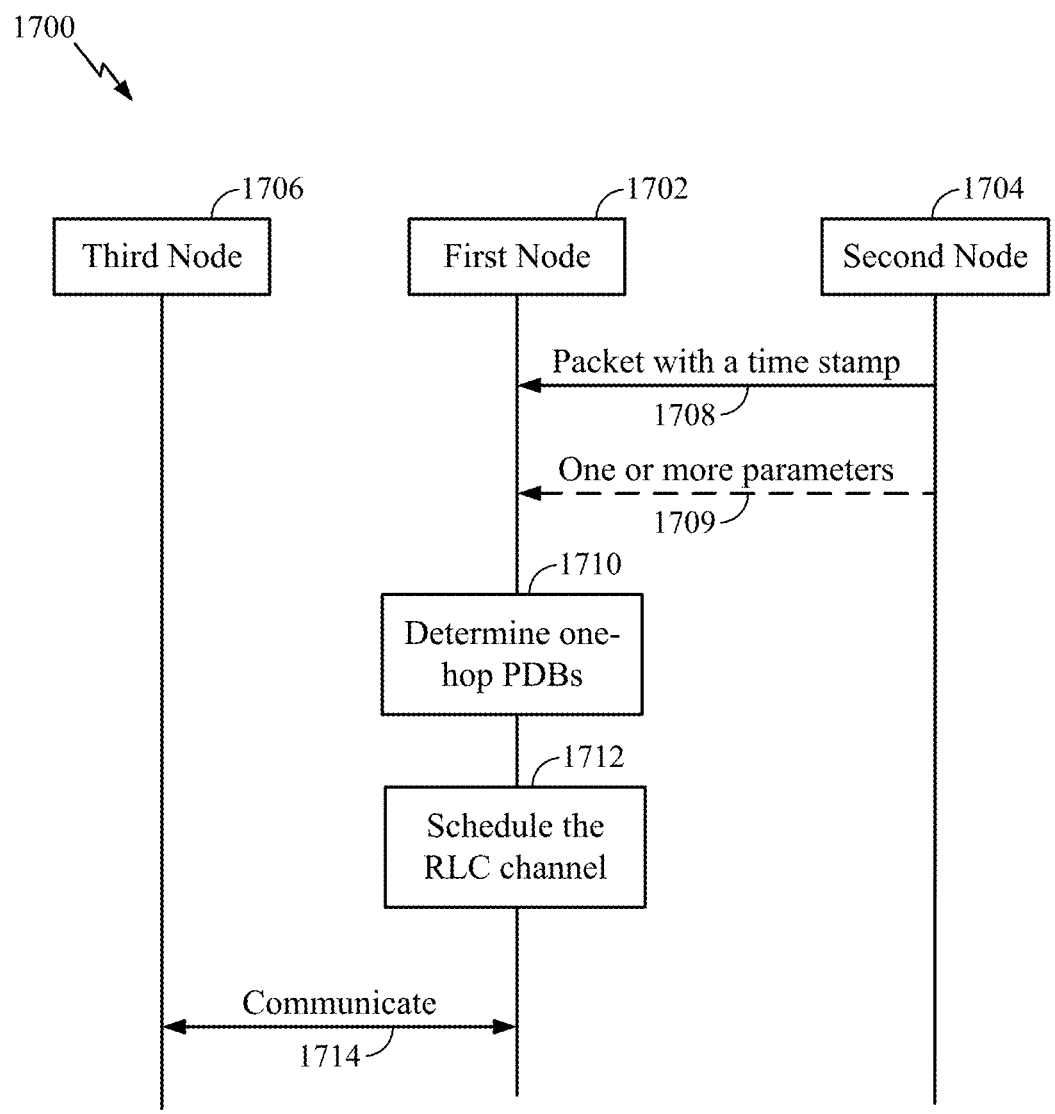
FIG. 17 is a call flow diagram illustrating example signaling for dynamic determination of one-hop PDB in an IAB node, in accordance with aspects of the present disclosure.

FIG. 17 is a call flow diagram 1700 illustrating example signaling for dynamic determination of one-hop PDB in an IAB node. In certain aspects, the operations 1600 of FIG. 16 may be understood in the deployment depicted by the call flow diagram 1700. As shown, a first node 1702, second node 1704, and a third node 1706 may be in an IAB network. In some cases (e.g., on downlink), the first node is an intermediate IAB node, the second node is an IAB donor node CU, and the third node is another IAB node or a UE.

As illustrated, at 1708, the first node 1702 receives (e.g., via direct or indirect wireless connection, where the wireless connection may refer to connection via one or more intermediate IAB-nodes), from the second node 1704, a packet including at least a time stamp. In some examples, the time stamp is included in a header (e.g., a backhaul adaptation protocol (BAP) header) of the packet. In certain aspects, the time stamp is based on a configured arrival pattern, which may be indicated, by the second node 1704 (e.g., via F1 application protocol (AP) and/or a radio resource control (RRC) message), by a burst arrival time and a periodicity. In some cases, the time stamp is associated with a TSC QoS flow. Optionally, one or more additional parameters may be, at 1709, received by the first node 1702 (e.g., via F1-AP and/or RRC). For example, the additional parameters may include an end-to-end latency bound (e.g., end-to-end PDB) associated with the packet. A reference time at the source node can be the time stamp carried by the packet header. The additional parameters may include a number of remaining hops associated with a routing path for the packet. For example, the remaining number of hops associated with a BAP routing path that the packet takes may be provided as part of a routing table configuration. For a given packet, the BAP routing path ID indicating may be carried in the BAP header of the packet. The additional parameters may include a weighting factor associated with the routing path for the packet.

At 1710, the first node determines a one-hop PDB for the packet over an RLC channel between the first node and a third node. In some cases, the determination be based, at least in part, on the time stamp. In certain aspects, the determination may also be based on one or more additional parameters received at 1709.

In some example, the determination of the one-hop PDB at 1710 may be based on a quotient of a difference between the PDB and a previous latency and a number of remaining hops (e.g., (PDB-PreviousLatency)/remNumHops). Thus, the remaining time budget of the total end-to-end PDB, after the latency experienced from previous hops, can be divided equally among the remaining hops. The first node can determine the latency of the packet over previous hops based on time of reception of the packet and the time stamp.

In some cases, the PDB determination at 1710 may be based on a product of the weighting factor and a difference between the PDB and the previous latency (e.g., weight* (PDB-PreviousLatency)). In this case, the weighting factor may be less than or equal to one. Thus, an IAB node may use a percentage of the remaining time budget based on a weighting factor associated with the IAB node. In certain aspects, the weighting factor may be selected based on channel conditions at the first node and/or traffic loading the first node. Further, the weighting factor may be associated with a particular routing path that the packet takes. In some examples, a table of weighting factors corresponding to various routing paths that pass through the IAB-node can be configured to the IAB-node. The IAB-node may select a proper weighting factor for a packet based on the routing path taken by the packet determined from the BAP header of the packet.

At 1712, as shown, the first node schedules the RLC channel based on the PDB determination made at 1710. At 1714, the first node 1702 may communicate with the third node 1706 via the RLC channel between the first node 1702 and the third node 1714 based on the scheduling.

Figure 18:
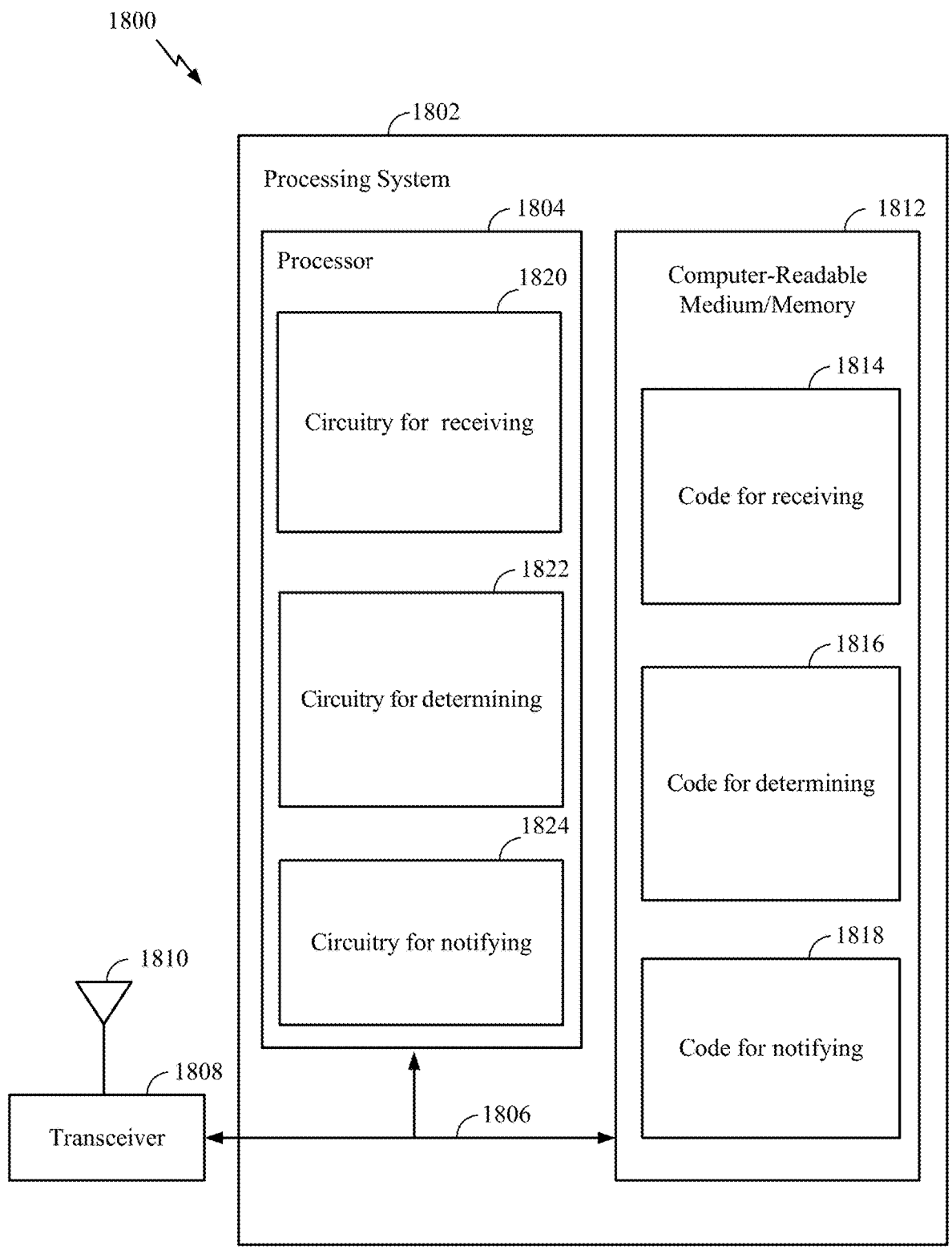
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 12. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/ memory 1812 is configured to store instructions (e.g., computer-executable code) that when executed by the processor 1804, cause the processor 1804 to perform the operations illustrated in FIG. 12, or other operations for performing the various techniques discussed herein for dynamic PDB coordination between a parent IAB node and a child IAB node for an RLC channel. In certain aspects, computer-readable medium/memory 1812 stores code 1814 for receiving; code 1816 for determining; and/or code 1818 for notifying, in accordance with aspects of the disclosure. In certain aspects, the processor 1804 has circuitry configured to implement the code stored in the computer-readable medium/memory 1812. The processor 1804 includes circuitry 1820 for receiving; circuitry 1822 for determining; and/or circuitry 1824 for notifying, in accordance with aspects of the disclosure.

Means for receiving may include a receiver and/or an antenna(s) 234 of the BS 110a or a receiver and/or antenna(s) 252 of the UE 120a illustrated in FIG. 2 and/or circuitry 1820 of the communication device 1800 in FIG. 13. Means for determining may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1802 and the circuitry 1822 of the communication device 1800 in FIG. 18. Means for notifying may include a receiver and/or an antenna(s) 234 of the BS 110a or a receiver and/or antenna(s) 252 of the UE 120a illustrated in FIG. 2 and/or circuitry 1824 of the communication device 1800 in FIG. 18.

Figure 19:
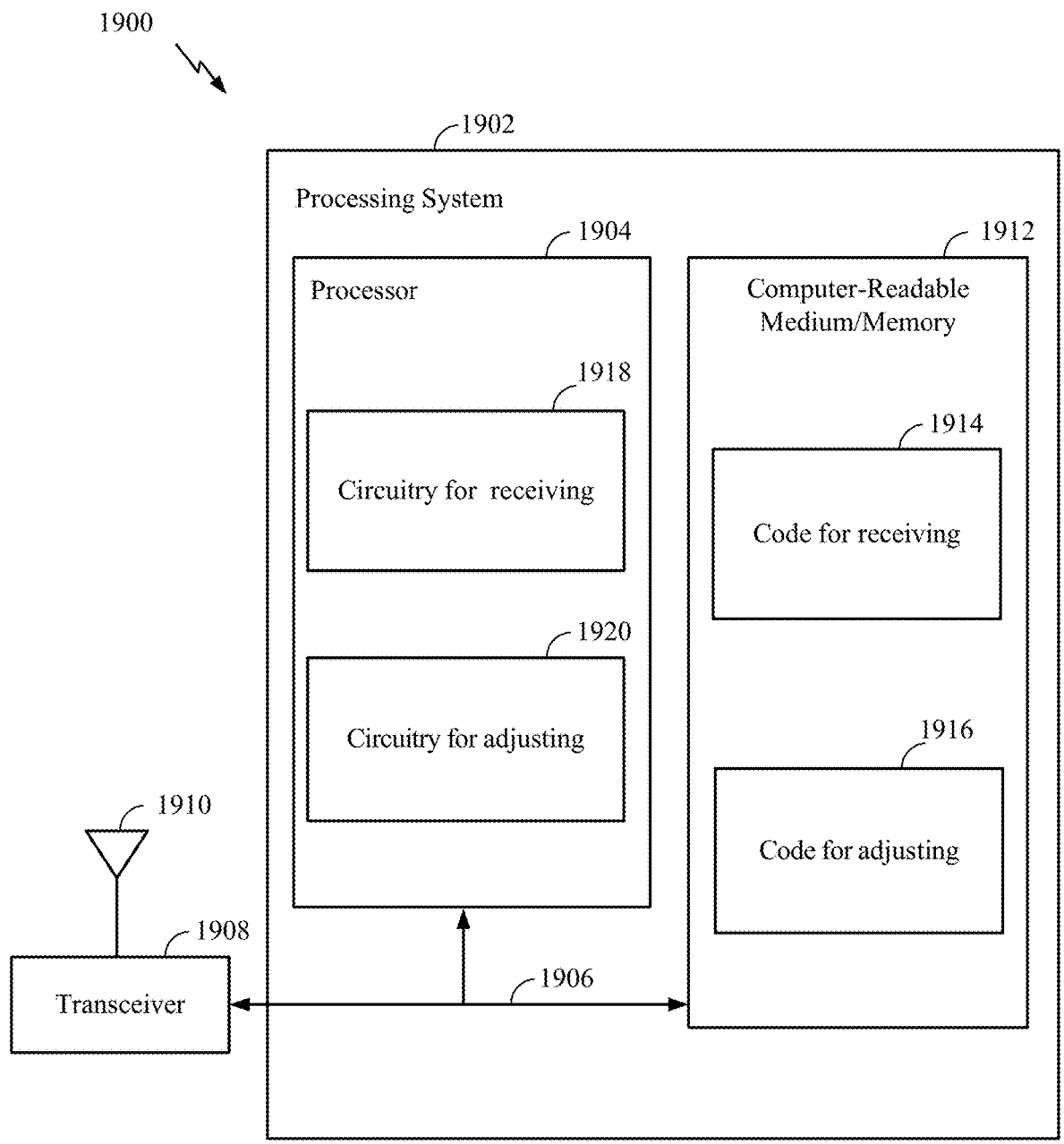
FIG. 19 illustrates a communications device that may include various components configured to perform operations for the techniques disclosed herein in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIG. 13. The communications device 1900 includes a processing system 1902 coupled to a transceiver 1908 (e.g., a transmitter and/or a receiver). The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/ memory 1912 is configured to store instructions (e.g., computer-executable code) that when executed by the processor 1904, cause the processor 1904 to perform the operations illustrated in FIG. 13, or other operations for performing the various techniques discussed herein for dynamic PDB coordination between a parent IAB node and a child IAB node for an RLC channel. In certain aspects, computer-readable medium/memory 1912 stores code 1914 for receiving and/or code 1916 for adjusting, in accordance with aspects of the disclosure. In certain aspects, the processor 1904 has circuitry configured to implement the code stored in the computer-readable medium/memory 1912. The processor 1904 includes circuitry 1918 for receiving and/or circuitry 1920 for adjusting, in accordance with aspects of the disclosure.

Means for receiving may include a receiver and/or an antenna(s) 234 of the BS 110a or a receiver and/or antenna(s) 252 of the UE 120a illustrated in FIG. 2 and/or circuitry 1918 of the communication device 1900 in FIG. 19. Means for adjusting may include the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the circuitry 1920 of the communication device 1900 in FIG. 19.

Example Clauses

Clause 1: A method for wireless communication by a first node, comprising: receiving a configuration of a first one-hop packet delay budget (PDB) for a first radio link control (RLC) channel scheduled by the first node; determining a second one-hop PDB to use for the first RLC channel; and notifying a second node of a PDB adjustment value to be applied for a second RLC channel scheduled by the second node, wherein the PDB adjustment value is at least based on a difference between the first one-hop PDB and the second one-hop PDB.

Clause 2: The method of Clause 1, wherein the configuration of the first one-hop PDB is semi-static.

Clause 3: The method of any one of Clauses 1 or 2, wherein determining the second one-hop PDB to use for the first RLC channel comprises: dynamically adjusting the first one-hop PDB based on one or more channel conditions of the first RLC channel, buffer loading at the first node, or a combination thereof.

Clause 4: The method of any one of Clauses 1 through 3, wherein for downlink communication: the first node is an integrated access and backhaul (IAB) node or an IAB donor node, the second node is a child IAB node of the first node, the first RLC channel scheduled by the first node is a wireless backhaul RLC channel between the first node and the second node, the second RLC channel scheduled by the second node is a wireless RLC channel between the second node and a third node, and the third node is a child IAB node or a child user equipment (UE) of the second node.

Clause 5: The method of any one of Clauses 1 through 4, wherein for uplink communication: the first node is an integrated access and backhaul (IAB) node, the second node is a parent IAB node of the first node, the first RLC channel scheduled by the first node is a wireless RLC channel between the first node and a third node, the third node is a child IAB node or a child user equipment (UE) of the first node, and the second RLC channel scheduled by the second node is a wireless backhaul RLC channel between the second node and the first node.

Clause 6: The method of any one of Clauses 1 through 5, wherein: determining the second one-hop PDB to use for the first RLC channel comprising determining the first node is able to deliver packets over the first RLC channel sooner than the configured first one-hop PDB; and notifying the second node of the PDB adjustment value comprises notifying the second node that extra PDB is available for use by the second node for the second RLC channel scheduled by the second node.

Clause 7: The method of any one of Clauses 1 through 6, wherein: determining the second one-hop PDB to use for the first RLC channel comprising determining the first node is unable to deliver packets over the first RLC channel within the configured first one-hop PDB; and notifying the second node of the PDB adjustment value comprises sending a request to the second node to borrow the PDB adjustment value from the second node.

Clause 8: The method of Clause 7, further comprising receiving a response from the second node accepting or rejecting the request.

Clause 9: The method of Clause 8, wherein the response indicates a maximum value of the PDB that the second node can lend to the first node when the second node rejects the request.

Clause 10: The method of Clause 9, wherein the notifying by the first node, the response from the second node, or both are carried by a medium access control (MAC) control element (CE), downlink (DL) physical layer control signaling, uplink (UL) physical layer control signaling, or a combination thereof.

Clause 11: The method of any one of Clauses 1 through 10, wherein the PDB is associated with a quality-of-service (QoS) flow and a data radio bearer (DRB) for a wireless access RLC channel or a wireless backhaul RLC channel.

Clause 12: The method of any one of Clauses 1 through 11, wherein determining the second one-hop PDB to use for the first RLC channel comprises: receiving a packet, from the second node, including a time stamp; determining the second one-hop PDB for the received packet over the first RLC channel based, at least in part, on the time stamp; and scheduling the first RLC channel based on the determination.

Clause 13: The method of Clause 12, wherein the time stamp is included in a header of the packet.

Clause 14: The method of Clause 13, wherein the header comprises a backhaul adaptation protocol (BAP) header.

Clause 15: The method of any one of Clauses 12 through 14, wherein the time stamp is determined based on a configured arrival pattern.

Clause 16: The method of Clause 15, wherein the arrival pattern is indicated by a burst arrival time and a periodicity.

Clause 17: The method of any one of Clauses 15 or 16, wherein the time stamp is associated with a time sensitive communication (TSC) quality of service (QoS) flow.

Clause 18: The method of any one of Clauses 12 through 17, further comprising: receiving, from the second node, one or more additional parameters; and determining the second one-hop PDB further based on the one or more additional parameters.

Clause 19: The method of any one of Clauses 12 through 18, wherein determining the second one-hop PDB comprises determining the second one-hop PDB based on a quotient of a number of remaining hops and a difference between the PDB and a previous latency.

Clause 20: The method of any one of Clauses 12 through 19, wherein determining the second one-hop PDB comprises determining the second one-hop PDB based on a product of a weighting factor and a difference between the PDB and a previous latency.

Clause 21: A method for wireless communication by a first node, comprising: receiving a configuration of a first one-hop packet delay budget (PDB) for an RLC channel scheduled by the first node; receiving a notification including a PDB adjustment value from a second node to adjust the first one-hop PDB; and adjusting the first one-hop PDB using the PDB adjustment value to determine a second one-hop PDB to use for the RLC channel.

Clause 22: The method of Clause 21, wherein for downlink communication: the first node is a child IAB node of the second node, the RLC channel scheduled by the first node is a wireless backhaul RLC channel between the first node and a third node, and the third node is a child IAB node or a child user equipment (UE) of the first node.

Clause 23: The method of any one of Clauses 21 or 22, wherein for uplink communication: the first node is a parent IAB node of the second node, a third node is a child IAB node or a child user equipment (UE) of the second node, and the RLC channel scheduled by the first node is a wireless RLC channel between the first node and the second node.

Clause 24: The method of any one of Clauses 21 through 23, wherein the configuration of the first one-hop PDB is semi-static.

Clause 25: The method of any one of Clauses 21 through 24, wherein the first one-hop PDB is adjusted to determine the second one-hop PDB based on the PDB adjustment value received from the second node, and one or more channel conditions of the RLC channel, buffer loading at the first node, or a combination thereof.

Clause 26: The method of any one of Clauses 21 through 25, wherein the first node receives an extra PDB value to use for the RLC channel beyond the first one-hop PDB when the PDB adjustment value received from the second node has a positive PDB adjustment.

Clause 27: The method of any one of Clauses 21 through 26, wherein the first node has to reduce the first one-hop PDB by the PDB adjustment value and lend the PDB adjustment value to the second node when the PDB adjustment value received from the second node has a negative PDB adjustment.

Clause 28: The method of Clause 27, further comprising: sending a response to the second node to accept or reject a request for the negative PDB adjustment of the second node for lending the PDB adjustment value to the second node, wherein the response indicates a maximum value of the PDB that the first node can lend to the second node when the first node rejects the request.

Clause 29: An apparatus, comprising: a memory having executable instructions stored thereon; and a processor configured to execute the executable instructions in order to perform the operations of any one of Clauses 1 through 28.

Clause 30: An apparatus comprising: means for performing the operations of any one of Clauses 1 through 28.

Clause 31: A computer-readable medium having instructions stored thereon which, when executed by a processor, performs the operations of any one of Clauses 1 through 28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10 and FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first node, comprising:
  receiving a configuration of a first one-hop packet delay budget (PDB) for a first radio link control (RLC) channel scheduled by the first node;
  determining a second one-hop PDB to use for the first RLC channel; and
  notifying a second node of a PDB adjustment value to be applied for a second RLC channel scheduled by the second node, wherein the PDB adjustment value is at least based on a difference between the first one-hop PDB and the second one-hop PDB.

2. The method of claim 1, wherein the configuration of the first one-hop PDB is semi-static.

3. The method of claim 1, wherein determining the second one-hop PDB to use for the first RLC channel comprises:
  dynamically adjusting the first one-hop PDB based on one or more channel conditions of the first RLC channel, buffer loading at the first node, or a combination thereof.

4. The method of claim 1, wherein for downlink communication:
  the first node is an integrated access and backhaul (IAB) node or an IAB donor node, the second node is a child IAB node of the first node, the first RLC channel scheduled by the first node is a wireless backhaul RLC channel between the first node and the second node, the second RLC channel scheduled by the second node is a wireless RLC channel between the second node and a third node, and the third node is a child IAB node of the second node or a child user equipment (UE) of the second node.

5. The method of claim 1, wherein for uplink communication:
  the first node is an integrated access and backhaul (IAB) node, the second node is a parent IAB node of the first node, the first RLC channel scheduled by the first node is a wireless RLC channel between the first node and a third node, the third node is a child IAB node or a child user equipment (UE) of the first node, and the second RLC channel scheduled by the second node is a wireless backhaul RLC channel between the second node and the first node.

6. The method of claim 1, wherein:
  determining the second one-hop PDB to use for the first RLC channel comprising determining the first node is able to deliver packets over the first RLC channel sooner than the first one-hop PDB; and
  notifying the second node of the PDB adjustment value comprises notifying the second node that extra PDB is available for use by the second node for the second RLC channel scheduled by the second node.

7. The method of claim 1, wherein:
  determining the second one-hop PDB to use for the first RLC channel comprising determining the first node is unable to deliver packets over the first RLC channel within the first one-hop PDB; and
  notifying the second node of the PDB adjustment value comprises sending a request to the second node to borrow the PDB adjustment value from the second node.

8. The method of claim 7, further comprising receiving a response from the second node accepting or rejecting the request.

9. The method of claim 8, wherein the response indicates a maximum value of the PDB that the second node can lend to the first node when the second node rejects the request.

10. The method of claim 9, wherein the notifying by the first node, the response from the second node, or both are carried by a medium access control (MAC) control element (CE), downlink (DL) physical layer control signaling, uplink (UL) physical layer control signaling, or a combination thereof.

11. The method of claim 1, wherein the PDB is associated with a quality-of-service (QoS) flow and a data radio bearer (DRB) for a wireless access RLC channel or a wireless backhaul RLC channel.

12. The method of claim 1, wherein determining the second one-hop PDB to use for the first RLC channel comprises:
  receiving a packet, from the second node, including a time stamp;
  determining the second one-hop PDB for the packet over the first RLC channel based, at least in part, on the time stamp; and
  scheduling the first RLC channel based on the determination.

13. The method of claim 12, wherein the time stamp is included in a header of the packet.

14. The method of claim 13, wherein the header comprises a backhaul adaptation protocol (BAP) header.

15. The method of claim 12, wherein the time stamp is determined based on a configured arrival pattern.

16. The method of claim 15, wherein the configured arrival pattern is indicated by a burst arrival time and a periodicity.

17. The method of claim 15, wherein the time stamp is associated with a time sensitive communication (TSC) quality of service (QoS) flow.

18. The method of claim 12, further comprising:
receiving, from the second node, one or more additional parameters; and
determining the second one-hop PDB further based on the one or more additional parameters.

19. The method of claim 12, wherein determining the second one-hop PDB comprises determining the second one-hop PDB based on a quotient of a number of remaining hops and a difference between the PDB and a previous latency.

20. The method of claim 12, wherein determining the second one-hop PDB comprises determining the second one-hop PDB based on a product of a weighting factor and a difference between the PDB and a previous latency.

21. A method for wireless communication by a first node, comprising:
receiving a configuration of a first one-hop packet delay budget (PDB) for an RLC channel scheduled by the first node;
receiving a notification including a PDB adjustment value from a second node to adjust the first one-hop PDB; and
adjusting the first one-hop PDB using the PDB adjustment value to determine a second one-hop PDB to use for the RLC channel.

22. The method of claim 21, wherein for downlink communication:
the first node is a child IAB node of the second node, the RLC channel scheduled by the first node is a wireless backhaul RLC channel between the first node and a third node, and the third node is a child IAB node or a child user equipment (UE) of the first node.

23. The method of claim 21, wherein for uplink communication:
the first node is a parent IAB node of the second node, a third node is a child IAB node or a child user equipment (UE) of the second node, and the RLC channel scheduled by the first node is a wireless RLC channel between the first node and the second node.

24. The method of claim 21, wherein the configuration of the first one-hop PDB is semi-static.

25. The method of claim 21, wherein the first one-hop PDB is adjusted to determine the second one-hop PDB based on the PDB adjustment value received from the second node, and one or more channel conditions of the RLC channel, buffer loading at the first node, or a combination thereof.

26. The method of claim 21, wherein the first node receives an extra PDB value to use for the RLC channel beyond the first one-hop PDB when the PDB adjustment value received from the second node has a positive PDB adjustment.

27. The method of claim 21, wherein the first node has to reduce the first one-hop PDB by the PDB adjustment value and lend the PDB adjustment value to the second node when the PDB adjustment value received from the second node has a negative PDB adjustment.

28. The method of claim 27, further comprising:
sending a response to the second node to accept or reject a request for the negative PDB adjustment of the second node for lending the PDB adjustment value to the second node, wherein the response indicates a maximum value of the PDB that the first node can lend to the second node when the first node rejects the request.

29. An apparatus for wireless communications by a first node, comprising:
a memory having executable instructions stored thereon; and
a processor coupled with the memory, configured to execute the executable instructions to cause the apparatus to:
receive a configuration of a first one-hop packet delay budget (PDB) for a first RLC channel scheduled by the first node;
determine a second one-hop PDB to use for the first RLC channel; and
notify a second node of a PDB adjustment value to be applied for a second RLC channel scheduled by the second node, wherein the PDB adjustment value is at least based on a difference between the first one-hop PDB and the second one-hop PDB.

30. An apparatus for wireless communications by a first node, comprising:
a memory having executable instructions stored thereon; and
a processor coupled with the memory, configured to execute the executable instructions to cause the apparatus to:
receive a configuration of a first one-hop packet delay budget (PDB) for an RLC channel scheduled by the first node;
receive a notification including a PDB adjustment value from a second node to adjust the first one-hop PDB; and
adjust the first one-hop PDB using the PDB adjustment value to determine a second one-hop PDB to use for the RLC channel.

* * * * *